US012226351B2

(12) United States Patent
Lucas et al.

(10) Patent No.: US 12,226,351 B2
(45) **Date of Patent: *Feb. 18, 2025**

(54) HYDRAULIC CIRCUIT FOR A PATIENT HANDLING APPARATUS

(71) Applicant: Stryker Corporation, Kalamazoo, MI (US)

(72) Inventors: Ross T. Lucas, Paw Paw, MI (US); William Ross Heneveld, Jr., Kalamazoo, MI (US); Chad C. Souke, Vicksburg, MI (US); Thomas A. Puvogel, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,552

(22) Filed: Dec. 20, 2023

(65) Prior Publication Data

US 2024/0115440 A1 Apr. 11, 2024

Related U.S. Application Data

(63) Continuation of application No. 17/081,608, filed on Oct. 27, 2020, now Pat. No. 11,896,531.

(Continued)

(51) Int. Cl.

*F15B 1/02* (2006.01)
*A61G 1/02* (2006.01)

(Continued)

(52) U.S. Cl.

CPC ......... *A61G 1/0567* (2013.01); *A61G 1/0212* (2013.01); *A61G 1/0262* (2013.01);

(Continued)

(58) Field of Classification Search

CPC .... F15B 11/0423; F15B 11/044; F15B 11/055

See application file for complete search history.

(56) References Cited

U.S. PATENT DOCUMENTS 3,530,514 A 9/1970 McCalley
3,627,377 A 12/1971 Pickles (Continued)

FOREIGN PATENT DOCUMENTS

AU 200072007 6/2001
DE 3313843 10/1984

(Continued)

OTHER PUBLICATIONS

Stryker Bertec Medical Inc., The Go Bed Maintenance Manual, Dec. 2000.

(Continued)

*Primary Examiner* — Michael Leslie

(74) *Attorney, Agent, or Firm* — Warner Norcross + Judd LLP

(57) ABSTRACT

A patient handling apparatus includes a patient support surface, a base, and a hydraulic circuit. The hydraulic circuit includes a pump, a fluid reservoir, and a hydraulic cylinder operable to selectively raise or lower the patient support surface or the base. The hydraulic circuit controls flow of fluid between the cylinder and the fluid reservoir to thereby control the movement of the base or patient support surface. In addition, the hydraulic circuit may include a manual bypass circuit configured to bypass the pump in response to a manual input, which allows manual extension or retraction of the cylinder, for example, when the pump is not operational. The hydraulic circuit may also include a pump bypass circuit configured to bypass the pump to allow fluid to discharge from the cap end to the fluid reservoir for faster evacuation of fluid from the cylinder, thereby increasing retraction speed of the rod.

20 Claims, 17 Drawing Sheets

Related U.S. Application Data

(60) Provisional application No. 62/926,712, filed on Oct. 28, 2019.

(51) Int. Cl.
*A61G 1/056* (2006.01)
*F15B 11/042* (2006.01)
*F15B 13/044* (2006.01)

(52) U.S. Cl.
CPC .......... *F15B 1/024* (2013.01); *F15B 11/0423* (2013.01); *F15B 13/044* (2013.01); *F15B 2211/45* (2013.01)

(56) References Cited

U.S. PATENT DOCUMENTS

| | | | | |
|---|---|---|---|---|
| 3,724,003 | A | 4/1973 | Ellwanger et al. | |
| 4,078,269 | A | 3/1978 | Weipert | |
| 4,747,212 | A | 5/1988 | Cavdek | |
| 4,751,754 | A | 6/1988 | Bailey et al. | |
| 5,102,377 | A | 4/1992 | Spanski | |
| 5,161,274 | A | 11/1992 | Hayes et al. | |
| 5,355,743 | A | 10/1994 | Tesar | |
| 5,613,255 | A | 3/1997 | Bish et al. | |
| 5,701,618 | A | 12/1997 | Brugger | |
| 6,071,228 | A | 6/2000 | Speraw et al. | |
| 6,289,534 | B1 | 9/2001 | Hakamiun et al. | |
| 6,352,240 | B1 | 3/2002 | Eckstein et al. | |
| 6,421,854 | B1 | 7/2002 | Heimbrock | |
| 6,611,979 | B2 | 9/2003 | Welling et al. | |
| 6,659,935 | B2 | 12/2003 | Costanzo | |
| 6,886,200 | B2 | 5/2005 | Blyshak et al. | |
| 7,140,055 | B2 | 11/2006 | Bishop et al. | |
| 7,150,056 | B2 | 12/2006 | Lemire | |
| 7,171,708 | B2 | 2/2007 | Osborne et al. | |
| 7,296,312 | B2 | 11/2007 | Menkedick et al. | |
| 7,398,571 | B2 | 7/2008 | Souke et al. | |
| 7,441,291 | B2 | 10/2008 | Hayes et al. | |
| 7,454,805 | B2 | 11/2008 | Osborne et al. | |
| 7,533,429 | B2 | 5/2009 | Menkedick et al. | |
| 7,610,637 | B2 | 11/2009 | Menkedick et al. | |
| 7,653,954 | B2 | 2/2010 | Hornbach et al. | |
| 7,694,368 | B2 | 4/2010 | Lewis, Jr. | |
| 7,703,158 | B2 | 4/2010 | Wilker, Jr. et al. | |
| 7,886,380 | B2 | 2/2011 | Hornbach et al. | |
| 7,913,335 | B2 | 3/2011 | Carr | |
| 7,926,131 | B2 | 4/2011 | Menkedick et al. | |
| 8,051,513 | B2 | 11/2011 | Reed et al. | |
| 8,074,309 | B2 | 12/2011 | Hutchison et al. | |
| 8,104,120 | B2 | 1/2012 | Hornbach et al. | |
| RE43,193 | E | 2/2012 | Osborne et al. | |
| 8,151,387 | B2 | 4/2012 | Osborne et al. | |
| 8,176,584 | B2 | 5/2012 | Hornbach et al. | |
| 8,239,983 | B2 | 8/2012 | Chinn | |
| 8,256,048 | B2 | 9/2012 | Bly et al. | |
| 8,291,532 | B2 | 10/2012 | Hornbach et al. | |
| 8,321,976 | B1 | 12/2012 | Edgerton | |
| 8,458,833 | B2 | 6/2013 | Hornbach et al. | |
| 8,502,663 | B2 | 8/2013 | Riley et al. | |
| 8,607,384 | B2 | 12/2013 | Hornbach | |
| 8,621,690 | B2 | 1/2014 | Hornbach et al. | |
| 8,844,078 | B2 | 9/2014 | Hornbach et al. | |
| 8,863,331 | B2 | 10/2014 | Valentino et al. | |
| 9,138,173 | B2 | 9/2015 | Penninger et al. | |
| 9,227,822 | B2 | 1/2016 | Horne | |
| 9,486,373 | B2 | 11/2016 | Lambarth et al. | |
| 10,898,399 | B2 | 1/2021 | Paul et al. | |
| 10,987,260 | B2 | 4/2021 | Souke et al. | |
| 11,141,334 | B2 * | 10/2021 | Naber | A61G 1/0567 |
| 11,583,455 | B2 * | 2/2023 | Souke | F15B 13/042 |
| 11,666,494 | B2 * | 6/2023 | Souke | A61G 1/0567 5/611 |
| 11,730,650 | B2 * | 8/2023 | Mansfield | A61G 7/1073 5/611 |
| 11,730,652 | B2 * | 8/2023 | Mansfield | A61G 1/0212 5/83.1 |
| 11,865,051 | B2 * | 1/2024 | Souke | F15B 13/0405 |
| 11,896,531 | B2 * | 2/2024 | Lucas | A61G 1/0262 |
| 2002/0178502 | A1 | 12/2002 | Beasley et al. | |
| 2004/0055087 | A1 | 3/2004 | Edgerton | |
| 2007/0169269 | A1 | 7/2007 | Wells | |
| 2009/0165208 | A1 | 7/2009 | Reed et al. | |
| 2009/0222988 | A1 | 9/2009 | Reed et al. | |
| 2010/0000017 | A1 | 1/2010 | Laloge et al. | |
| 2010/0199433 | A1 | 8/2010 | Clenet | |
| 2012/0124746 | A1 | 5/2012 | Andrienko et al. | |
| 2014/0033435 | A1 | 2/2014 | Jutras | |
| 2014/0041120 | A1 | 2/2014 | Li | |
| 2014/0189954 | A1 | 7/2014 | Lee | |
| 2014/0325759 | A1 | 11/2014 | Bly et al. | |
| 2016/0136021 | A1 | 5/2016 | Roussy et al. | |
| 2016/0302985 | A1 | 10/2016 | Tessmer et al. | |
| 2017/0035628 | A1 | 2/2017 | Naber et al. | |
| 2017/0172819 | A1 | 6/2017 | Bourgraf et al. | |
| 2017/0281440 | A1 | 10/2017 | Puvogel et al. | |
| 2018/0214326 | A1 | 8/2018 | Lacasse et al. | |
| 2018/0303685 | A1 | 10/2018 | Souke et al. | |
| 2019/0247254 | A1 | 8/2019 | Naber et al. | |
| 2019/0247257 | A1 | 8/2019 | Furman et al. | |
| 2020/0330306 | A1 | 10/2020 | Elku et al. | |
| 2021/0186781 | A1 | 6/2021 | Souke et al. | |

FOREIGN PATENT DOCUMENTS

| | | |
|---|---|---|
| EP | 0364394 | 4/1990 |
| EP | 0736275 | 9/1996 |
| JP | 02156950 | 6/1990 |
| KR | 20140003301 | 1/2014 |
| WO | 9629970 | 10/1996 |
| WO | 0117399 | 3/2001 |
| WO | 0117400 | 3/2001 |
| WO | 0123847 | 4/2001 |
| WO | 2007069912 | 6/2007 |
| WO | 2013066198 | 5/2013 |
| WO | 2014150652 | 9/2014 |
| WO | 2014191684 | 12/2014 |
| WO | 2015032003 | 3/2015 |

OTHER PUBLICATIONS

Stryker Bertec Medical Inc., The Go Bed Operations Manual, Dec. 2000.

Stryker, S3 MedSurg Bed with StayPut Frame Operations Manual, Jun. 2016.

* cited by examiner

HYDRAULIC CIRCUIT FOR A PATIENT HANDLING APPARATUS

BACKGROUND

The present disclosure relates to a hydraulic circuit and control system that can be used, for example, in a patient handling apparatus, such as emergency cot, medical bed, stretcher, stair chair, or other apparatuses that support a patient where manual operation or increased speed of a hydraulic component, such as a hydraulic cylinder used to move the base or deck of a patient handling apparatus, is desired.

For example, when a patient handling apparatus, such as an emergency cot, is to be loaded into an emergency vehicle, such as an ambulance, the patient handling apparatus is moved to the rear of the emergency vehicle. Once at the rear of the emergency vehicle, the cot is then at least partially inserted into the vehicle compartment so that it is initially supported on one end on the compartment floor, for example, by its head end wheels. Alternately, the cot may be moved onto a loading arm or arms, which extend from the emergency vehicle into the cot and fully support the cot but do not interfere with the lifting mechanism. In either case, once the cot is supported (either by the head end wheels or the loading arm(s)), the cot's base can be raised to allow the cot to then be fully loaded into the emergency vehicle. The faster the base can be raised, the faster the patient handling apparatus can be loaded into the vehicle, and the quicker the patient can be delivered to the medical facility, typically an emergency room. Therefore, quick retraction of the base can be critical in some situations. Similarly, once at the medical facility, where the cot is unloaded from the vehicle, the faster the base can be lowered, the faster the patient can be brought into the medical facility.

The hydraulic circuit and control system of a patient handling apparatus are often powered by a battery, one or more electric motors, and electrically controlled valves included in the hydraulic circuit. An issue with electrically controlled hydraulic cylinders (of the hydraulic circuit) is that during power outages (e.g., when the batteries are depleted or dead), the hydraulic cylinder cannot be operated, and the cot cannot be raised or lowered. Loading and unloading of a patient into and out of an emergency vehicle requires that the base and/or frame be raised and lowered; therefore, loss of the function of the hydraulic circuit is undesirable. Additionally, because the wide range of loading conditions and the demands on the cylinder that lifts and lowers the deck of the cot (or raises and lowers the base), the hydraulic circuits can experience some "sponginess" due to pressure variations in the cylinder chambers on either side of the piston.

Accordingly, there is a need to provide a patient handling apparatus with a hydraulic circuit and control system that can quickly move one component relative to another component, such as an emergency cot's base relative to the cot's frame and provide smooth motion during the raising or lowering. There is also a need for an emergency back-up or override for the hydraulic circuit so that the frame of the cot may still be manually raised and lowered, for example, in the event of a power outage.

SUMMARY

Accordingly, a patient handling apparatus with a hydraulic circuit and control system is disclosed that can move extend or retract a hydraulic cylinder more quickly when needed without causing significant pressure drops, which could otherwise result in sudden motion of the cylinder.

In one embodiment, a patient handling apparatus includes a patient support surface, such as a deck, a base, and a hydraulic circuit. The hydraulic circuit includes a fluid reservoir, a pump, and a hydraulic cylinder operable to selectively raise or lower the patient support surface or the base. The hydraulic cylinder has a rod, a cap end chamber, and a rod end chamber. The hydraulic circuit is operable to control the flow of hydraulic fluid between the hydraulic cylinder and the fluid reservoir. Further, the hydraulic circuit includes a pump bypass circuit configured to selectively open fluid communication between one of the chambers of the hydraulic cylinder, such as the cap end chamber, and the fluid reservoir to bypass the pump. The pump bypass circuit provides faster evacuation of the hydraulic fluid from the cylinder, such as the cap end chamber of the hydraulic cylinder, thus increasing the speed, such as the retraction speed, of the rod and quickly raising the base relative to the patient support surface.

In one aspect, the patient handling apparatus includes a control system operable to control the hydraulic circuit and the flow of fluid through the hydraulic circuit.

In another aspect, the bypass circuit includes a control valve to control fluid communication between the cap end chamber and the fluid reservoir. The bypass circuit is configured to selectively open the control valve.

In one aspect, the control valve is a solenoid valve, and the control system is in communication with the solenoid valve to control the opening or closing of the solenoid valve.

In yet another aspect, the hydraulic circuit includes a check valve assembly to control the speed of fluid flow into the rod end chamber.

In another aspect, the hydraulic circuit includes an accumulator for maintaining submersion of the pump inlet in the hydraulic fluid.

In another embodiment, a patient handling apparatus includes a patient support surface, a base, and a hydraulic circuit. The hydraulic circuit includes a fluid reservoir, a pump, and a hydraulic cylinder operable to selectively raise or lower the patient support surface or the base. The hydraulic circuit is operable to control the flow of hydraulic fluid between the hydraulic cylinder and the fluid reservoir. Further, the hydraulic circuit includes a manual bypass circuit configured to selectively bypass the pump yet maintain fluid communication between the hydraulic cylinder and the fluid reservoir to manually operate the hydraulic cylinder.

In one aspect, the manual bypass circuit includes a manually operated valve, which is configured to open in response to a manual input applied by a user and to allow fluid to be directed through the manual bypass circuit.

In a further aspect, the hydraulic circuit is configured to increase the pressure in the cap end chamber of the cylinder to assist in the full extension of the cylinder when in the manual mode. For example, the hydraulic circuit may include an accumulator in fluid communication with the reservoir to charge the reservoir with hydraulic fluid when in the manual mode.

In another aspect, the manual bypass circuit is operable to allow the weight of the base to manually extend the hydraulic cylinder. Optionally, the manual bypass circuit is also operable to allow manual lifting of the base or lowering of the patient support surface to retract the hydraulic cylinder. Further, in one embodiment, the manual bypass circuit is operable to allow fluid communication between the reservoir and both the cap end chamber and the rod end chamber of the cylinder, thereby bypassing the pump.

In yet another embodiment, a patient handling apparatus includes a patient support surface, a base, and a hydraulic circuit. The hydraulic circuit includes a pump, a fluid reservoir, and a hydraulic cylinder operable to selectively raise or lower the patient support surface or the base. The hydraulic cylinder has a rod, a cap end chamber, and a rod end chamber. The hydraulic circuit is operable to control the flow of hydraulic fluid between the hydraulic cylinder and the fluid reservoir. Further, the hydraulic circuit includes a manual bypass circuit and a pump bypass circuit. The manual bypass circuit is configured to selectively bypass the pump in response to a manual input applied by a user. Fluid is directed through the manual bypass circuit to allow manual raising or lowering of the patient support surface or the base. The pump bypass circuit is configured to selectively bypass the pump to allow fluid to discharge from the cap end chamber to the fluid reservoir for faster evacuation of hydraulic fluid from the cap end chamber of the hydraulic cylinder, thereby allowing increased retraction speed of the rod to quickly raise the base relative to the patient support surface.

In another embodiment, a patient handling apparatus includes a patient support surface, a base, and a hydraulic circuit. The hydraulic circuit includes a pump having an inlet, a fluid reservoir, and a hydraulic cylinder operable to selectively raise or lower the patient support surface or the base. The hydraulic cylinder has a rod, a cap end chamber, and a rod end chamber. Further, an accumulator is in fluid communication with the hydraulic circuit to maintain proper pressure throughout the hydraulic circuit and, optionally, to keep the inlet of the pump submerged in hydraulic fluid.

Accordingly, the present disclosure provides a patient handling apparatus with a hydraulic circuit that can manage the pressure on either side the hydraulic cylinder's piston (rod side and cap side) to quickly move the rod and, in turn, the component moved by the cylinder, such as an emergency cot's base (relative to the cot's frame), while providing smooth motion during the raising or lowering and, in some cases, while providing additional fluid or adjusting the pressure when needed. The present disclosure also provides an emergency back-up or override for the pump so that the cot may still be raised and lowered in the event of a power outage.

These and other objects, advantages, purposes and features will become more apparent from the study of the following description taken in conjunction with the drawings.

DETAILED DESCRIPTION

Figure 1:
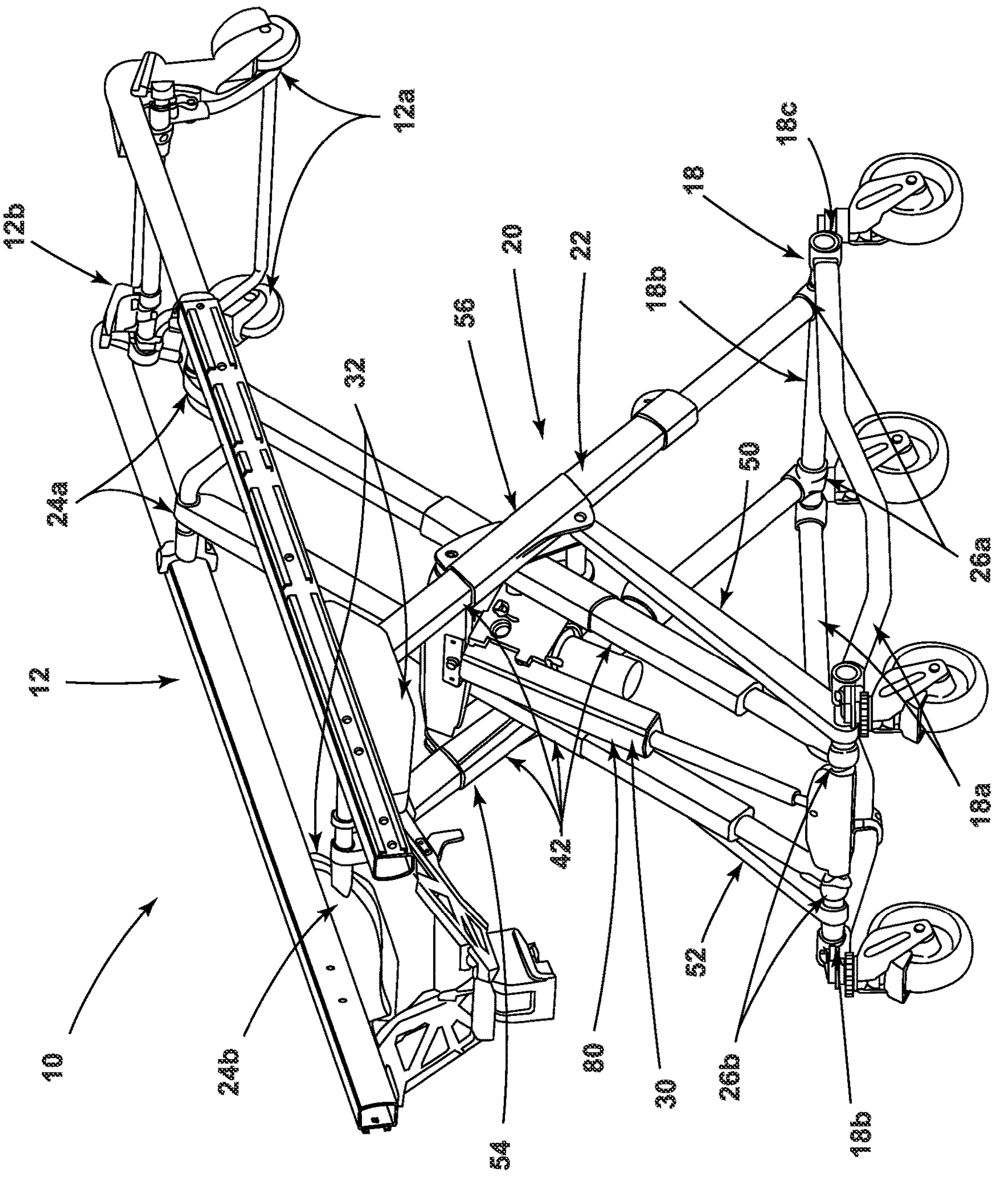
FIG. 1 is a perspective view of a patient handling apparatus (with the patient support surface removed) with the lift assembly in a transport (raised) configuration.

Referring to FIG. 1, the numeral 10 generally designates a patient handling apparatus. The term "patient handling apparatus" is used broadly to mean an apparatus that can support a patient, such as a medical bed, including an apparatus that can transport a patient, such as an emergency cot, a stretcher, a stair chair, or other apparatuses that support and/or transport a patient. Further, the term "patient" is used broadly to include persons that are under medical treatment or an invalid, or persons who just need assistance. Although the patient handling apparatus 10 is illustrated as an emergency cot, the term "patient handling apparatus" should not be so limited.

Figure 2:
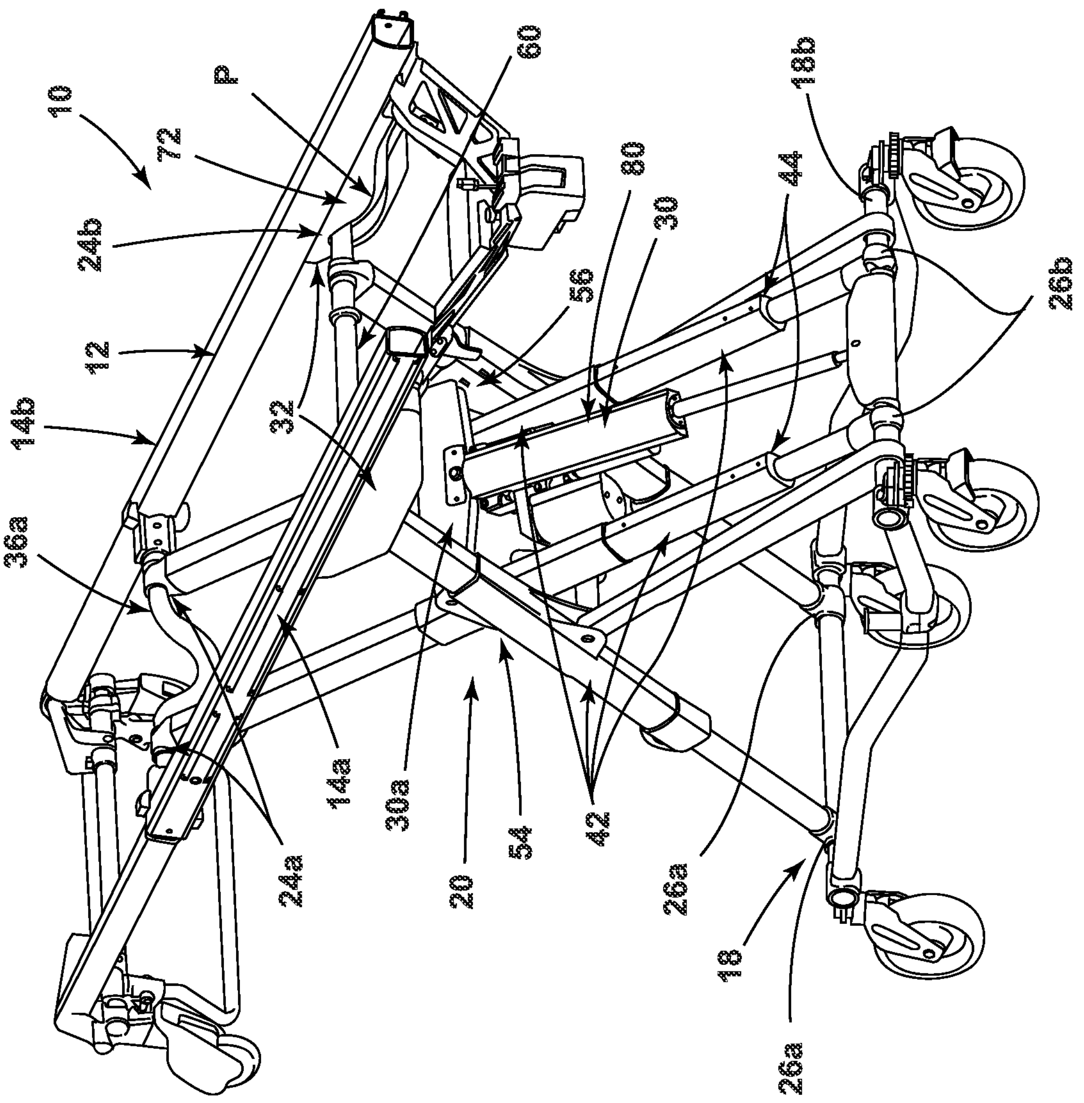
FIG. 2 is a second perspective view of the patient handling apparatus of FIG. 1.
Figure 3:
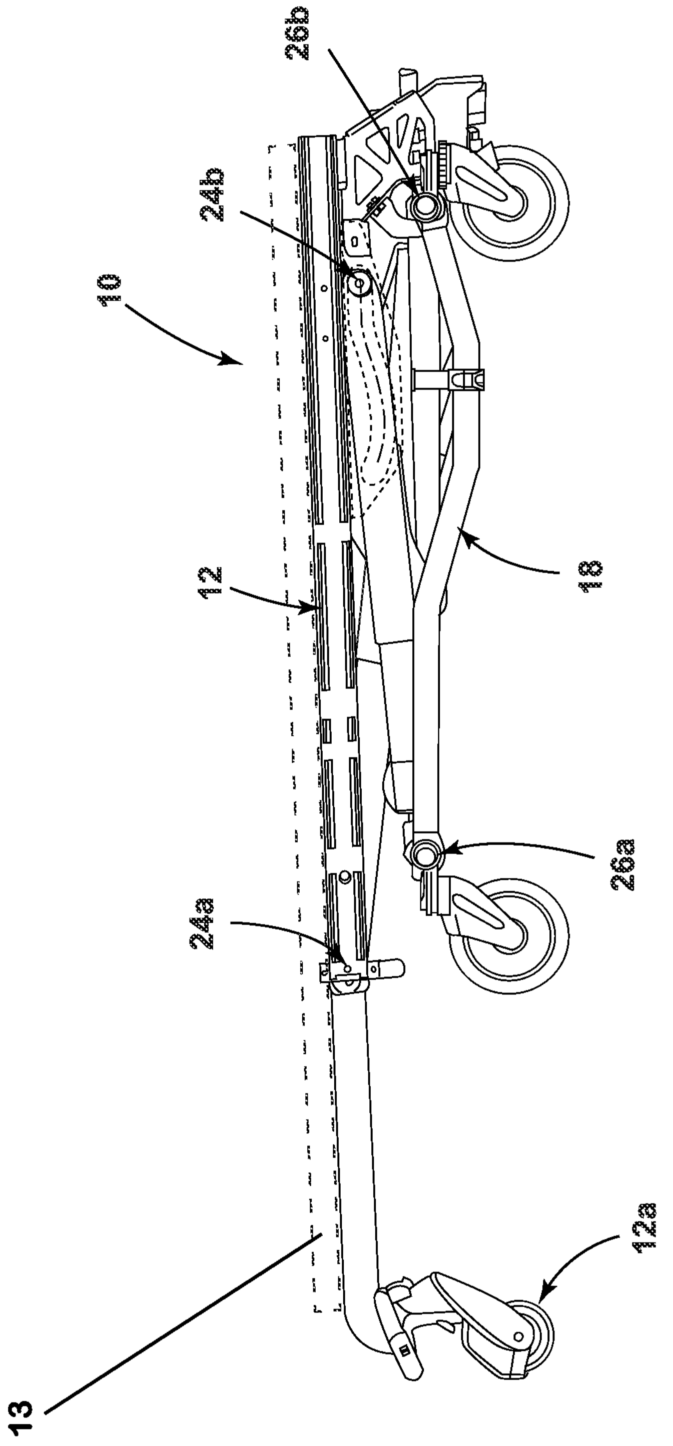
FIG. 3 is a side elevation view of the patient handling apparatus in a loading configuration whereon the frame is lowered to its lowest position relative to the base.
Figure 4:
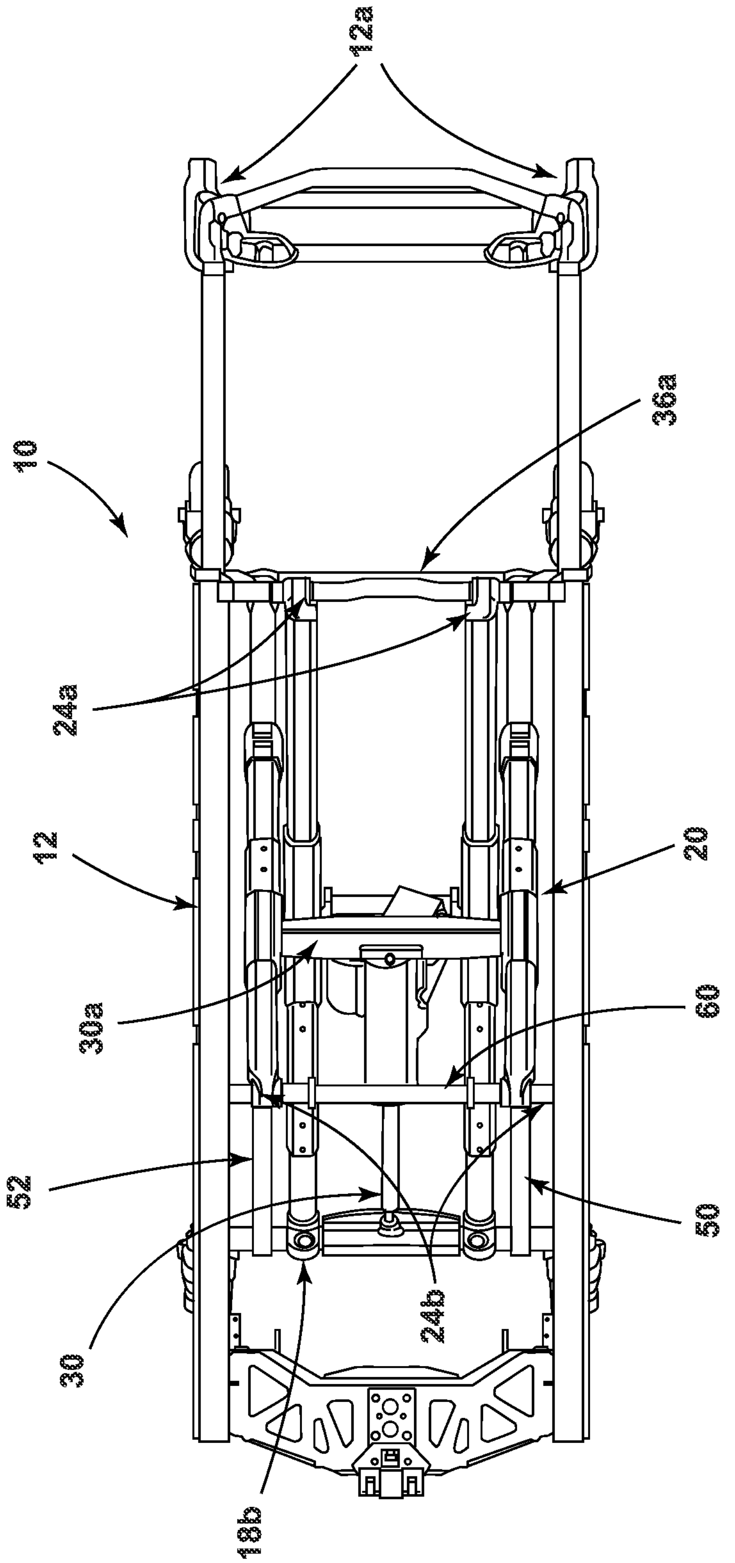
FIG. 4 is a top plan view of the patient handling apparatus of FIG. 3.
Figure 5:
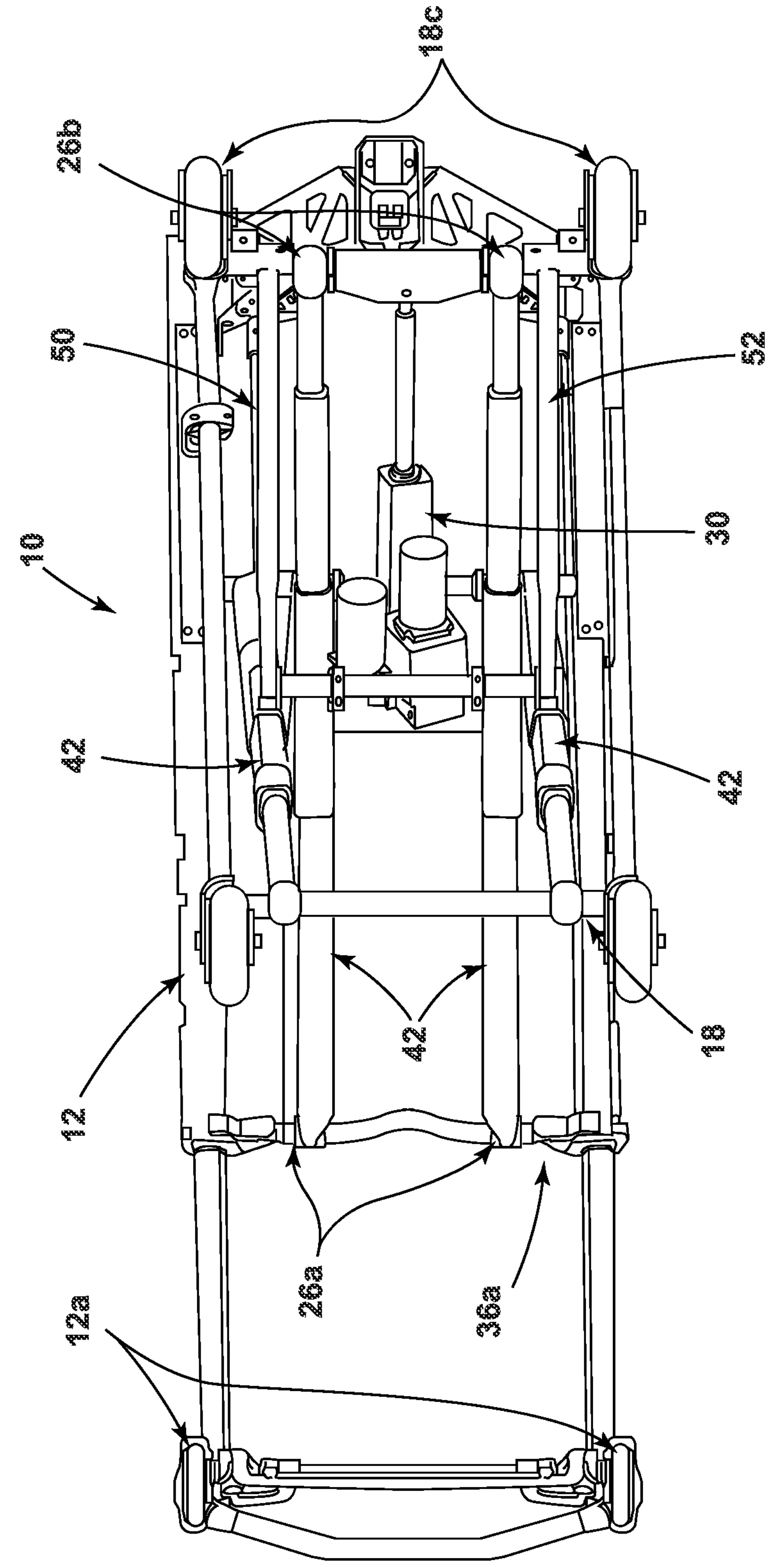
FIG. 5 is a bottom plan view of the patient handling apparatus of FIG. 3.

Referring to FIGS. 1-3, patient handling apparatus 10 includes a frame 12, which in the illustrated embodiment comprises a litter frame that supports a litter deck 13 (shown in phantom FIG. 3), which forms a patient support surface, and a base 18. Although not illustrated, litter deck 13 may comprise an articulatable deck with a head section, a seat section, and a leg section. As will be more fully described below, patient handling apparatus 10 includes a lift assembly 20 that raises or lowers the base 18 or the frame 12 with respect to the other so that the patient handling apparatus 10 can be rearranged between a loading configuration where the frame is lowered to it lowermost position relative to the base 18 (see e.g., FIG. 3), for example, for loading into an emergency vehicle, such as an ambulance, and a patient transport configuration for use in transporting a patient on the patient handling device across a ground surface (see e.g., FIG. 1). Further, as will be more fully described below, the mounting of lift assembly 20 to the frame 12 is optionally configured to allow the frame 12 (and deck 13) to be tilted relative to the lift assembly 20 so that one end (e.g., head-end or foot-end) of the frame 12 (and deck 13) can be raised beyond the fully raised height of the lift assembly to allow the patient handling apparatus to be inserted more easily into the compartment of an emergency vehicle.

Referring again to FIG. 1, frame 12 (and hence deck 13) is mounted to base 18 by lift assembly 20, which includes load bearing members 22 pivotally coupled to the frame 12 and to the base 18. In the illustrated embodiment, load bearing members 22 are pivotally coupled to the frame 12 by head-end upper pivot connections 24*a* and foot-end upper pivot connections 24*b*. Further, as will be more fully described below, head-end upper pivot connections 24*a* are fixed to the frame 12 along the longitudinal axis 12*b* of frame 12 and foot-end upper pivot connections 24*b* are movable so that the head-end of frame 12 can be tilted upwardly (as shown in FIG. 1), as more fully described below.

In the illustrated embodiment, each load bearing member 22 comprises a telescoping compression/tension member 42. Compression/tension members 42 may be pivotally joined at their medial portions about a pivot axis to thereby form a pair of X-frames 44 (FIG. 2). The upper ends of each X-frame 44 are, therefore, pivotally mounted to the frame 12 by head-end upper pivot connections 24*a* and foot-end upper pivot connections 24*b*. The lower ends of each X-frame 44 are pivotally mounted to the base 18 by head-end lower pivot connections 26*a* and foot-end lower pivot connections 26*b*. However, it should be understood that load bearing members 22 may comprise fixed length members, for example such of the type shown in U.S. Pat. No. 6,701,545, which is commonly owned by Stryker Corp. of Kalamazoo, MI and incorporated herein by reference in its entirety. For another example of suitable lift assembly reference is made to U.S. Pat. Nos. 7,398,571 and 9,486,373, which are commonly owned by Stryker Corp. of Kalamazoo, MI and incorporated herein by reference in their entireties.

In addition to load bearing members 22, patient handling apparatus 10 includes a pair of linkage members 50 and 52 (FIG. 1), which are pivotally mounted on one end to transverse frame member 18*b* of base 18 and on their other ends to brackets 54, 56 (FIG. 1), which mount to the X-frames. Brackets 54 and 56 also mount linear actuator 30 to X-frames 44, which vertically extends or contracts the lift assembly to raise or lower frame 14 relative to the base 18 (or raise or lower base relative to the frame 12) described below. Brackets 54 and 56, therefore, pivotally mount linkage members 50 and 52, as well as actuator 30 (described below), to the X-frames 44 so that member 50, 52 provide a timing link function as well as a moment coupling function. It should be understood that multiple actuators may be used to raise or lower frame 12 and, further, that the actuator or actuators may be mounted with a different arrangement, such as shown in the above referenced patents.

As best seen in FIG. 1, base 18 is formed by longitudinal frame members 18*a* and transverse frame members 18*b*, which are joined together to form a frame for base 18. Mounted to the longitudinal frame members 18*a* are bearings 18*c*, such as wheels or castors. Transverse frame members 18*b* provide a mount (as noted above) for the lower pivot connections 24*a*, 24*b* of load bearing members 22, and also for the rod end of the actuator 30 (best shown in FIG. 2). The upper end of actuator 30 is mounted between the X-frames 44 (formed by load bearing members 22) by a transverse member 30*a* (FIG. 2) that is rotatably mounted between brackets 54, 56.

In its cot loading/unloading position, cot 10 is moved to the back of the emergency vehicle compartment where it is at least partially inserted into, or pulled from, the compartment so that the head-end of the frame 12 is positioned at the rear of the emergency vehicle compartment and head-end wheels 12*a* (FIG. 1) rest on the deck of the emergency vehicle compartment. In this loading/unloading position, the head-end of the frame 12 is supported on the compartment floor and the base 18 is free to be raised or lowered. Further, in the loading/unloading position, the frame 12 can be supported, for example, by an attendant or supported by a loading and unloading apparatus.

Figure 1A:
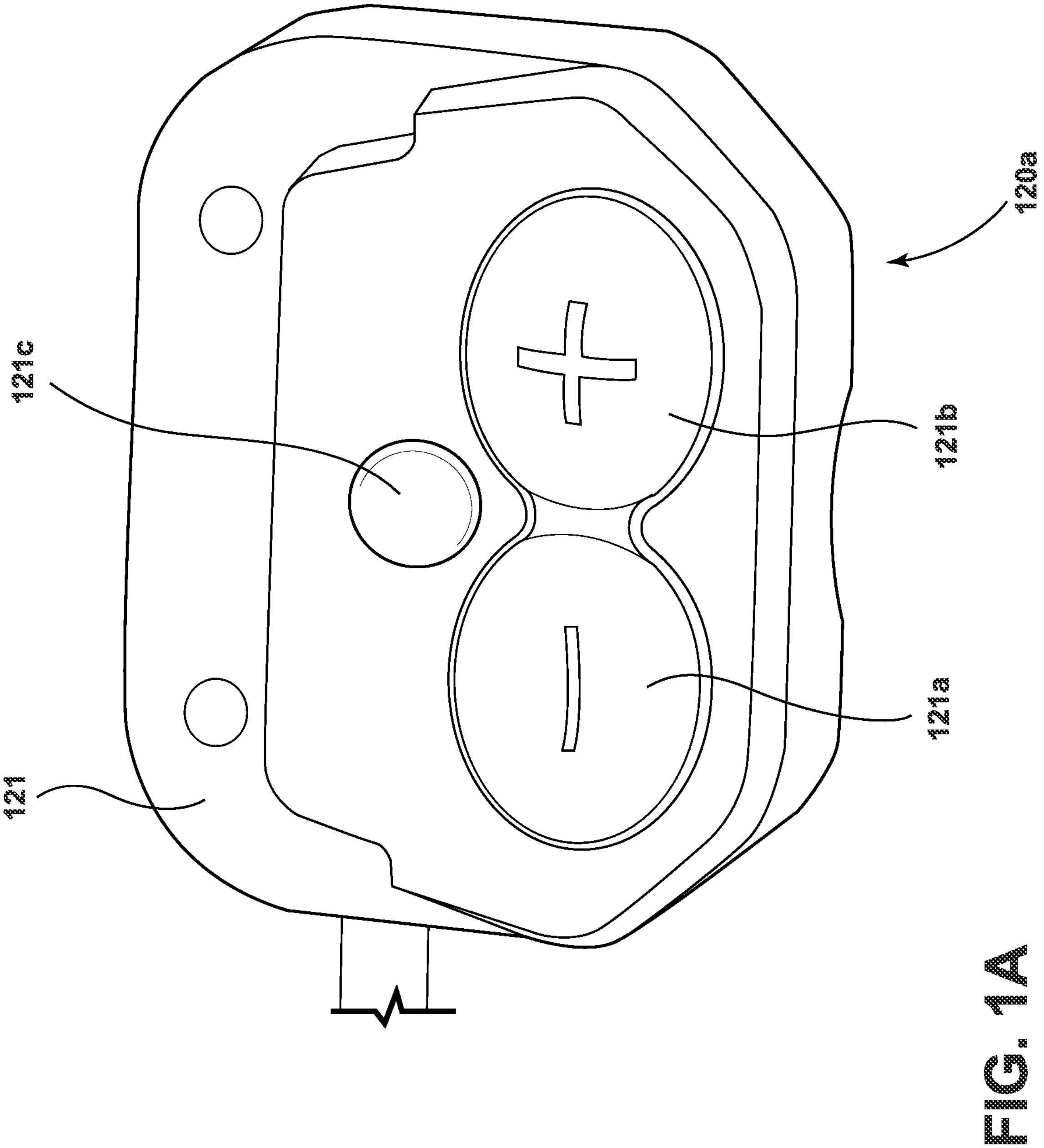
FIG. 1A is a perspective view of user interface controls.
Figure 6:
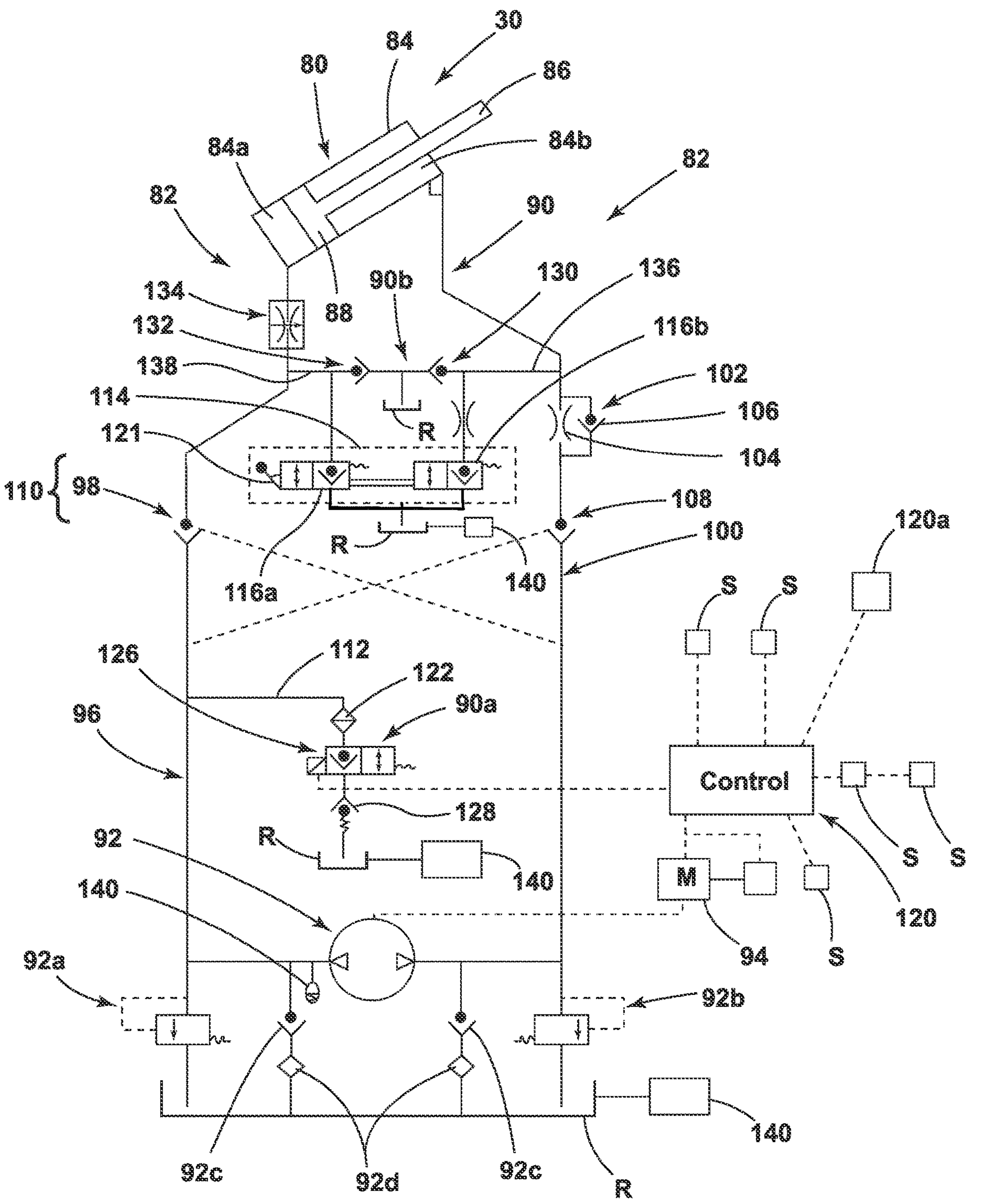
FIG. 6 is schematic drawing of a control system for controlling the hydraulic cylinder of the patient handling apparatus when powered.

As noted above, lift assembly 20 is extended or contracted by actuator 30. Referring to FIG. 6, in the illustrated embodiment actuator 30 comprises a hydraulic cylinder 80, which is controlled by a control system 82. As best seen in FIG. 2, hydraulic cylinder 80 is coupled on its rod end to transverse frame member 18*b* and at its opposed, cap end to transverse member 30*a*. Although one actuator is illustrated, as noted, it should be understood that more than one actuator or cylinder may be used. As will be more fully described below, control system 82 includes a hydraulic circuit 90 and a controller 120, which is in communication with hydraulic circuit and a user interface 120*a* that allows an operator to select between the lifting, lowering, raising, and retracting functions described herein. For example, user interface controls 120*a* may comprise one or more buttons 121*a*, 121*b* (FIG. 1A) or have a touch screen with touch screen areas or may comprise a key pad with push buttons, such as directional buttons, or switches, such as key switches, that correspond to the lifting, lowering, raising, and retracting functions described herein to allow the user to select the mode of operation and generate input signals to controller 120. As will be more fully described below, the controller 120 may also automatically control the mode of operation.

In one embodiment, control system 82 is configured to raise or lower the frame 12 (and hence deck 13) or base 18 in response to user input at user interface controls 120*a*. For example, user interface controls 120*a* may be provided in the form of buttons (FIG. 1A), which are supported on a housing 121 that mounts to the head end of the frame of the cot. For example, when button 121*a* is depressed, button 121*a* generates a signal to the controller of the control system 82, which is configured to retract the base in response to the signal being received. When button 121*b* is depressed, control system 82 similarly will extend the base in the response to the signal. Optionally, user interface controls 120*a* may include a third button 121*c*, which when depressed generates a signal to the control system to extend or retract the cylinder to raise or lower the frame 12 and deck 13 as needed to maintain a specified height, such as a "safe transport height." The use of a safe transport height provides repeatability and removes human error when trying to properly position the litter deck for transport. For an example of a suitable control system and a safe transport height, reference is made to co-pending U.S. patent application Ser. No. 16/271,114, which is entitled PATIENT TRANSPORT APPARATUS WITH DEFINED TRANSPORT HEIGHT, filed on Feb. 9, 2019, which is incorporated by reference herein in its entirety.

Referring again to FIGS. 6 and 6A-6E, cylinder 80 includes cylinder housing 84 with a reciprocal rod 86. Mounted at one end of rod 86 is a piston 88, which is located within the cylinder housing 84, which divides the cylinder into a cap-end chamber 84*a* and a rod-end chamber 84*b*. Rod 86 extends through the rod-end chamber 84*b* and from the cylinder housing 84 to couple the extendible end of the cylinder in a conventional manner to transverse member 18*b* of base 18. And as described above, the other end or fixed end (also referred to as "cap end") of cylinder 80 is mounted to transverse member 30*b* between brackets 54, 56.

Cylinder 80 is extended or retracted by control system 82 (to extend or contract lift assembly 20) and generally operates in eight modes—six powered modes and two manual modes. The first four powered modes are namely: Mode 1 to raise the frame 12 by extending the lift assembly 20 when base 18 is supported on, for example, a ground surface (FIG. 6A), Mode 2 to lower the frame 12 by retracting the lift assembly 20 when base 18 is supported on, for example, a ground surface (FIG. 6B), Mode 3 to lower the base 18 by extending (controllably lowering) the lift assembly 20 when the apparatus 10 is in its loading configuration and the frame 12 is supported in the loading/unloading position (FIG. 6A), or Mode 4 to retract the base 18 when apparatus 10 is in its transport configuration and the frame 12 is supported in the loading/unloading position (FIG. 6B). Modes 1-4 are powered modes and generally conducted at nominal speed. Modes 5 and 6 are also powered modes and used when the base needs to be moved quickly, as will be more fully described below. In addition, as noted, there are two manual modes—(1) where the frame is supported, for example, in the loading/unloading position by an emergency vehicle, and the base is either extended (under the force of gravity) or retracted manually by an EMS person; and (2) where the base is supported on a floor or ground surface and the deck needs to be raised relative to the base.

Referring to FIGS. 6 and 6A-6E, as noted above, control system 82 includes a hydraulic circuit 90 with a pump 92, which is in fluid communication with a fluid reservoir R, to circulate the fluid between the reservoir R and the cylinder 80 to extend or contract the cylinder 80. It is to be understood that the pump 92, cylinder 80, and the various conduits carrying hydraulic fluid to and from the cylinder are typically always filled with hydraulic fluid. Further, while reference is made to one reservoir, several reservoirs may be used. Pump 92 is driven by an electric motor 94 (both of which are optionally reversible), which motor is controlled by controller 120 to thereby control pump 92 and control the flow of fluid to and from the cylinder. As described in more detail below, additional controls are provided below in the form of hydraulic components, and optional electro-mechanically controlled hydraulic components.

Referring to FIG. 6B, the output of the pump 92, in one direction of operation, will supply hydraulic fluid through hydraulic conduit 100, which includes a pilot operated check valve 108, to the rod end chamber 84*b* of the cylinder 80 to thereby retract the rod, for example, to raise the base. The pilot operated check valve 108 allows the low of fluid toward the rod end chamber but blocks the flow away from the rod end chamber unless it is opened by a pilot signal from the check valve on the cap side of the hydraulic circuit.

Operation of the pump 92 in the opposite direction will direct fluid through a hydraulic conduit 96 with a pilot operated check valve 98 and an adjustable flow control valve 134 in series therewith, which in turn is in fluid communication with the cap end chamber 84*a* of the cylinder 80 to extend the rod and thereby extend the base or lift the frame (depending on whether the base is supporting the cot on the ground). Similar to check valve 108, check valve 98 allows the flow of fluid toward the cap end chamber but blocks the flow away from the cap end chamber unless it is opened by a pilot signal from the check valve on the rod side of the hydraulic circuit.

Optionally, hydraulic conduit 100 may include a check valve assembly 102. The check valve assembly 102 is in fluid communication with rod end chamber 84*b* of the cylinder 80, which provides back pressure on the rod end chamber 84*b* when the rod is extending to slow the fluid flow down sufficiently to allow the cap end chamber 84*a* to fully fill, but then allows fluid to flow unimpeded to the rod end chamber 84*b* when the rod is being retracted. Check valve assembly 102 includes an orifice 104, which throttles the fluid (provides back pressure on the rod end chamber 84*b*) to control the flow of fluid through hydraulic conduit 100 when the rod is being extended) and a poppet or check valve 106 connected in parallel with the orifice 104, which is closed when fluid flows from the rod end chamber 84*b* and opens when fluid flows to the rod end chamber 84*b* (when the rod 86 is being retracted). The orifice 104 size may be selected based on the application (for example, based on the weight of load on deck, the pump size, the size of the cylinder, to name a few) or the orifice 104 may be selectively adjustable. This restriction (generated by the orifice) eliminates the potential vacuum created by the disparity in the volume of fluid that is exiting the rod end chamber 84*b* relative to the volume of fluid that is entering the cap end chamber 84*a*. When operating at higher speeds, the check valve assembly 102 is useful to slow the fluid down to avoid a sinking effect when the hydraulic cylinder 80 supports the load of the cot 10.

Hydraulic circuit 90 also includes a bypass circuit 90*a* (FIGS. 6 and 6A-6E) through hydraulic conduit 112, which is in fluid communication with conduit 96. Hydraulic conduit 112 is in fluid communication with the reservoir R through a control valve 126, such as a solenoid valve 126, in series with a check valve 128. The bypass circuit 90*a* may optionally include a filter 122 as well. The bypass circuit 90*a* is selectively opened by the control system 82 via valve 126 to allow fluid to be redirected from conduit 96 to the reservoir R, for example, when a quick retract of the base 18 is desired, as described in more detail below for Mode 5. It should be understood that in order for the solenoid to be effective, the pump may need to be running (or active).

To provide manual control of the cylinder 80, for example, when there is a power loss, hydraulic circuit 90 includes a manual bypass hydraulic circuit 90*b* (FIGS. 6 and 6A-6E). Manual bypass hydraulic circuit 90*b* allows fluid communication between the cylinder 80 and reservoir R, bypassing the pump 92 and pilot operated check valves 98 and 108 and check valve assembly 102. Manual bypass hydraulic circuit 90*b* includes hydraulic conduits 136 and 138, which are in fluid communication with conduits 96 and 100 and in fluid communication with reservoir R via a manually operable release valve assembly 114 and/or check valves 130 and 132, respectively. As will be more fully described below, when manually operated manual release valve assembly 114 is opened, fluid flow between the cylinder 80 and reservoir R is controlled by the pressure in the cylinder's chambers generated by force applied to the rod of the cylinder in lieu of flow of fluid from the pump. For example, the force may extend the rod (i.e., the frame is supported, and the base is lowered by gravity) or the contract the rod due to a force applied on the base (i.e., the base is supported and the frame is lowered onto the base under the force of gravity or the frame is supported and an EMS person lifts the base). Therefore, as would be understood, the manual bypass circuit 90*b* allows the cylinder to extend or contract based on a manually applied force to the cylinder 80 when the pump is not running (either due to loss of power or simply because the user wishes to manually lift or lower the deck or base).

Figure 6A:
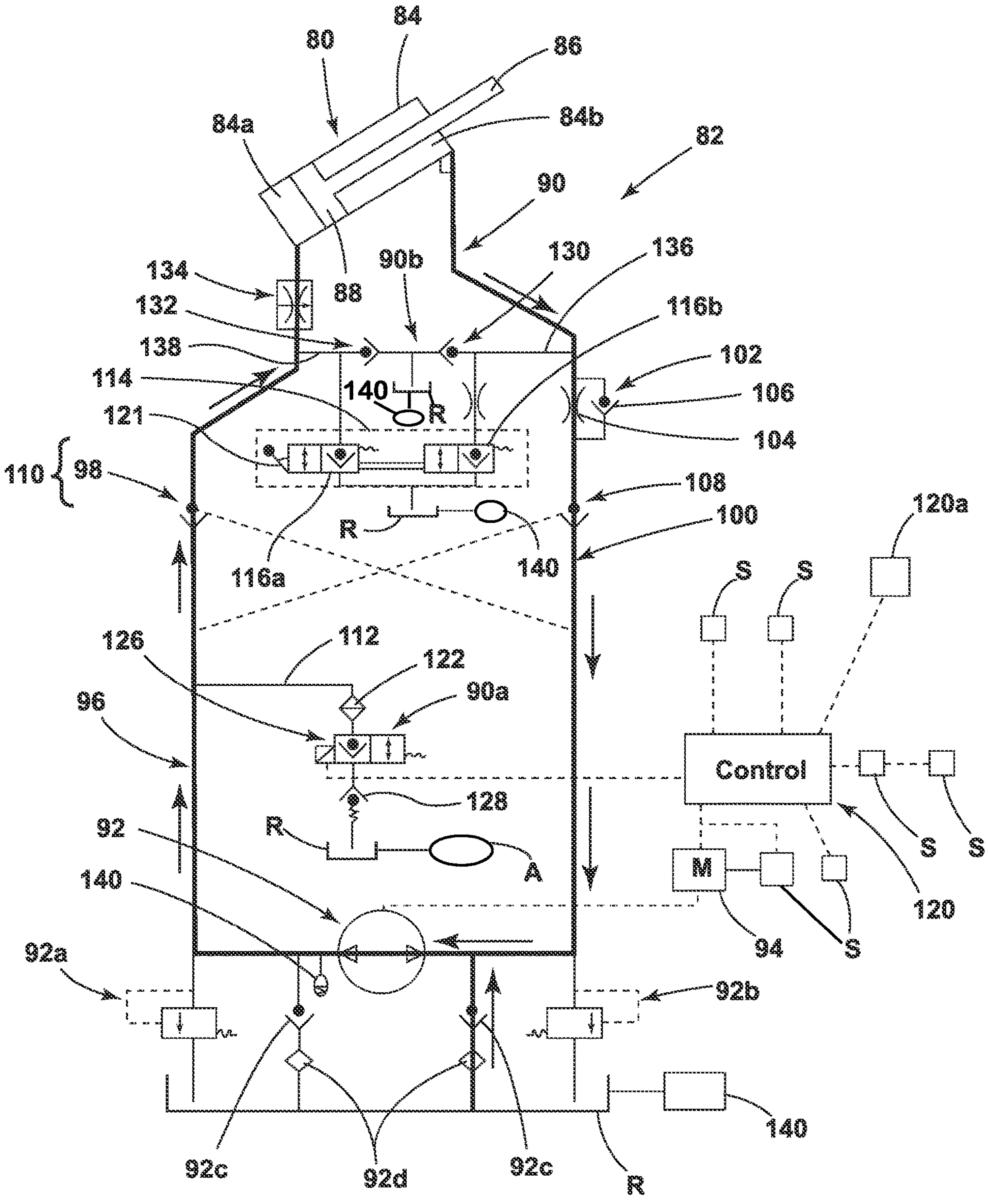
FIG. 6A is similar to FIG. 6 illustrating the flow of hydraulic fluid through the hydraulic circuit of the control system in a powered mode for extending the rod of the hydraulic cylinder, for example, for lifting the patient support surface, for example, when the base is supported on a floor or ground surface, or lowering the base of the patient handling apparatus, for example when the patient support surface is in a loading configuration and supported by an emergency vehicle.
Figure 6B:
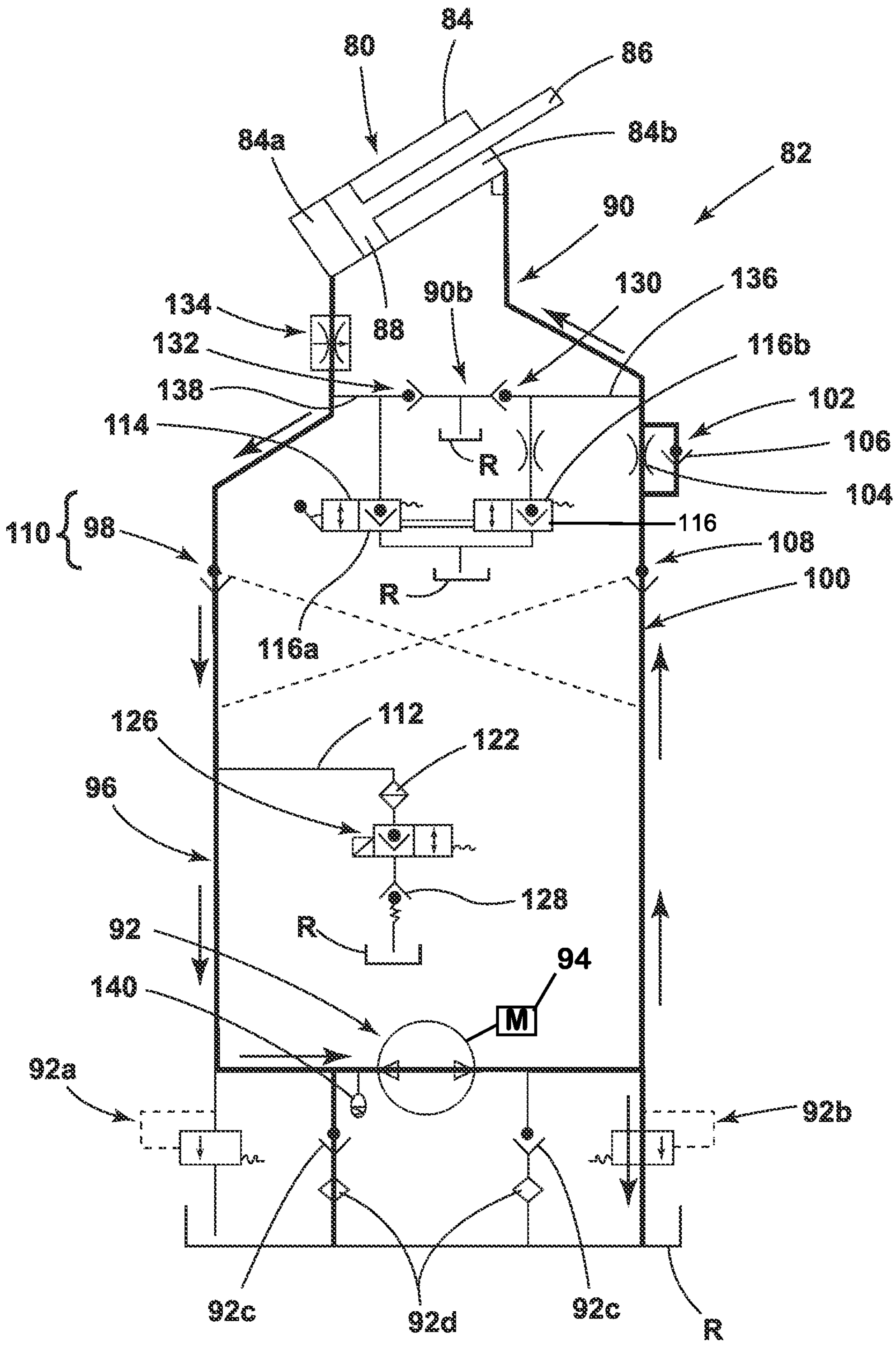
FIG. 6B is similar to FIG. 6 illustrating the flow of hydraulic fluid in another powered mode for retracting the rod of the cylinder, for example, to raise the base of the patient handling apparatus (for example when the patient support surface is in a transport configuration and supported by an emergency vehicle) or lowering the frame when the base is supported on a floor or ground surface.

Referring to FIG. 6A, in Modes 1 and 3 pump 92 is operated (by motor 94) to extend cylinder 80. Mode 1 is generally used to raise a patient support surface (often referred to the litter deck) of the cot 10 when the cot 10 is in its lowered or loading configuration and the wheels of the base 18 are on the ground and the full weight of the cot is resting on the base. Mode 3 is generally used to lower (extend) the base 18 from its loading configuration when the frame 12 is supported in the loading/unloading position—therefore, the base is not bearing the weight of the cot. When a user selects Mode 1 or Mode 3, controller 120 powers motor 94, which operates pump 92 to pump fluid from the reservoir R, through filter 92*d* and check valve 92*c*, into the hydraulic circuit 90 to direct the flow of fluid to the cap end chamber 84*a* of cylinder 80. In Modes 1 and 3, the output of the pump 92 (in the direction indicated by the arrows in FIG. 6A), will supply hydraulic fluid through hydraulic conduit 96, which includes pilot operated check valve 98, to the cap end chamber 84*a* of the cylinder housing 84, which is on the piston side of rod 86. When opened by the flow of fluid from the pump through conduit 96, check valve 98 generates a pilot signal to check valve 108 so that it too will open to allow the fluid discharged from the rod end chamber 84*b* to flow back to the pump 92 through hydraulic conduit 100, including check valve assembly 102 and pilot operated check valve 108. If the fluid flowing back to the pump 92 does not have sufficient pressure/flow rate, check valve 92*c* will open to allow the pump to draw more fluid from reservoir R.

When fluid is directed to cap end chamber 84*a*, the rod 86 will extend to lower the base 12 at a nominal speed. In Mode 1, extending the cylinder and lift assembly 20 raises the patient support surface. Mode 1 is used when base 18 is supported on a support surface, such as the ground, which can be detected by a controller 120 in various ways as mentioned below.

In Mode 3, extending the cylinder lowers the base 18 (and wheels of the cot 10) toward the ground. Mode 3 is used when base 18 is not supported on a support surface, and instead frame 12 is supported (for example, by an emergency vehicle deck) and base 18 is raised but an attendant wishes to lower the base to the ground. Fluid returns to the pump 92 through hydraulic conduit 100, including check valve assembly 102 and pilot operated check valve 108. As described below, when the base makes contact with the ground, the control system 82 may be configured to detect contact and use that as input to how the hydraulic system is controlled by a controller 120.

To avoid over pressurization, for example, when a heavy patient is supported on frame 12, fluid may be discharged from the hydraulic circuit 90. For example, when the pressure in the hydraulic circuit 90 exceeds a designated pressure (e.g., 3200 psi on the cap side of the hydraulic circuit, and 700 psi on the rod side of the hydraulic circuit) the pressure may be relieved through pressure relief valves 92*a* and 92*b*.

Referring to FIG. 6B, in Modes 2 and 4 the pump 92 is run to flow fluid to the rod end of the cylinder to contract the cylinder 80. Mode 2 is generally used to lower the patient support surface of the cot 10 when the cot 10 is in its transport configuration and the wheels of the base 18 are on the ground. In contrast, Mode 4 is generally used to raise (retract) the base 18 to its transport configuration when the frame 12 is supported in the loading/unloading position and the base is unloaded.

Optionally, as noted, valves 98 and 108 are provided as a dual pilot operated check valve assembly 110, which includes both valves (98 and 108) and allows fluid flow through each respective conduit in either direction. The valves 98 and 100 of the dual pilot operated check valve assembly are operated by the fluid pressure of the respective branch of hydraulic conduit (96 or 100) as well as the fluid pressure of the opposing branch of hydraulic conduit (96 or 100), as schematically shown by the dotted line in FIGS. 6A-6B. In Modes 2 and 4 the motor and pump are run at nominal speeds.

In Mode 2 or 4, the direction of pump 92 is reversed, so that fluid will flow in an opposite direction (see arrows in FIG. 6B) to cylinder 80 through hydraulic conduit 100, which is in fluid communication with the rod end chamber 84*b* of the cylinder housing 84. Conduit 100 includes check valve assembly 102, with orifice 104 and check valve 106 in parallel, to control the flow of fluid through conduit 100. Fluid flow in this direction will cause the rod 86 to retract and raise the base 12 (Mode 4) when the frame 12 is supported or will cause the rod 86 to retract and lower the frame 12 (Mode 2) when the base 18 is supported.

Referring again to FIG. 6A, when an operator wishes to raise frame 12 relative to base 18 (Mode 1), and base 18 is supported on the ground, the operator, using interface controls 120*a*, generates input signals that are communicated to controller 120, which may select the speed of the motor 94 based on signals from one or more sensors S, such as a sensor that indicates that the wheels of the base 18 are contacting and supported on the ground.

For example, as shown in Table 1 below, if the user selects the input that indicates extension of the cylinder (e.g., the + button in FIG. 1A) and the controller 120 determines through one or more sensors S that the wheels are touching and supported on the ground, the controller will operate the motor and pump in Mode 1 ("Lift Mode").

If the user selects the input that indicates extension of the cylinder (e.g., the + button in FIG. 1A) and the controller 120 determines through one or more sensors S that the wheels are not touching or supported on the ground, and is connected to a loading apparatus, such as the PowerLOAD loading and unloading apparatus (available from Stryker Corporation of Kalamazoo, Michigan), the controller will operate the motor and pump in Mode 3 ("Extend Mode"). On the other hand, if the controller 120 determines that the wheels are not touching or supported on the ground, and not connected to a loading apparatus, such as the PowerLOAD loading and unloading apparatus, the controller will operate the motor and pump in Mode 5 ("High Speed Extend Mode").

If the user selects the input that indicates contraction of the cylinder (e.g., the – button in FIG. 1A) and the controller 120 determines through one or more sensors S that the wheels are touching and supported on the ground, the controller will operate the motor and pump in Mode 2 ("Lower Mode").

If the controller 120 determines through one or more sensors S that the wheels are not touching or supported on the ground, and is connected to a loading apparatus, such as the PowerLOAD loading and unloading apparatus (available from Stryker Corporation of Kalamazoo, Michigan), the controller will operate the motor and pump in Mode 4 ("Retract Mode"). On the other hand, if the controller 120 determines that the wheels are not touching or supported on the ground, and not connected to a loading apparatus, such as the PowerLOAD loading and unloading apparatus, the controller will operate the motor and pump in Mode 6 ("High Speed Extend Retract").

TABLE 1

Process flow in Powered Modes

| User Input | Cot "status" | Connected to PowerLOAD | Actuator Mode |
|---|---|---|---|
| Plus (+) | Wheels on ground | N/A | Lift |
| button | Wheels off ground | Yes | Extend |
| press | Wheels off ground | No | High speed extend |
| Minus (−) | Wheels on ground | N/A | Lower |
| button | Wheels off ground | Yes | Retract |
| press | Wheels off ground | No | High speed retract |

Figure 6C:
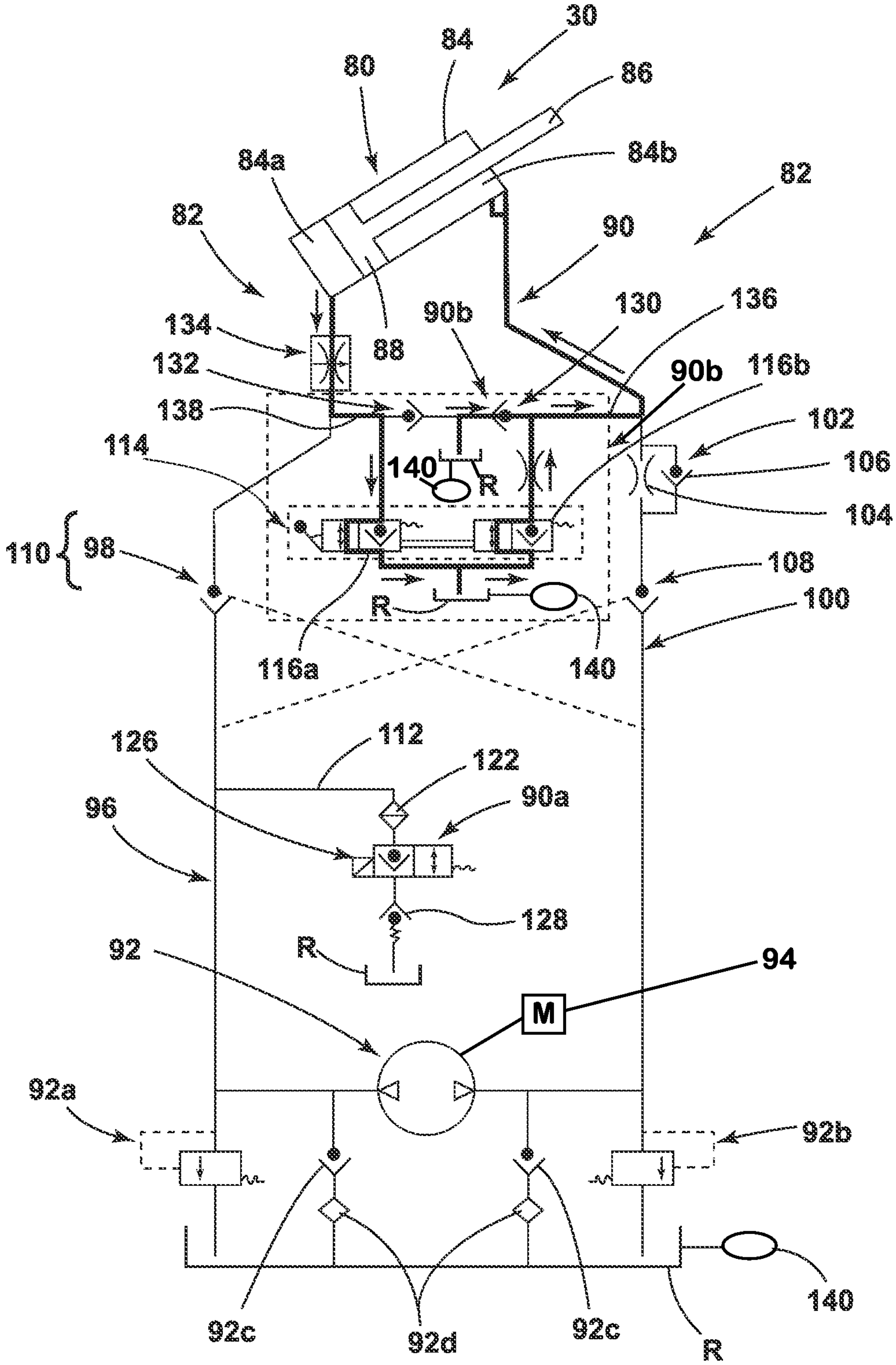
FIG. 6C is similar to FIG. 6 illustrating a manual mode in one embodiment of the ambulance patient handling apparatus illustrating the flow of hydraulic fluid when retracing the rod of the cylinder, such as when manually raising the base of the patient handling apparatus, for example when the patient support surface is in a transport configuration and supported by an emergency vehicle, or when manually lowering the patient support surface when the patient support surface is in a transport configuration and the base is supported on a floor or ground surface.
Figure 6D:
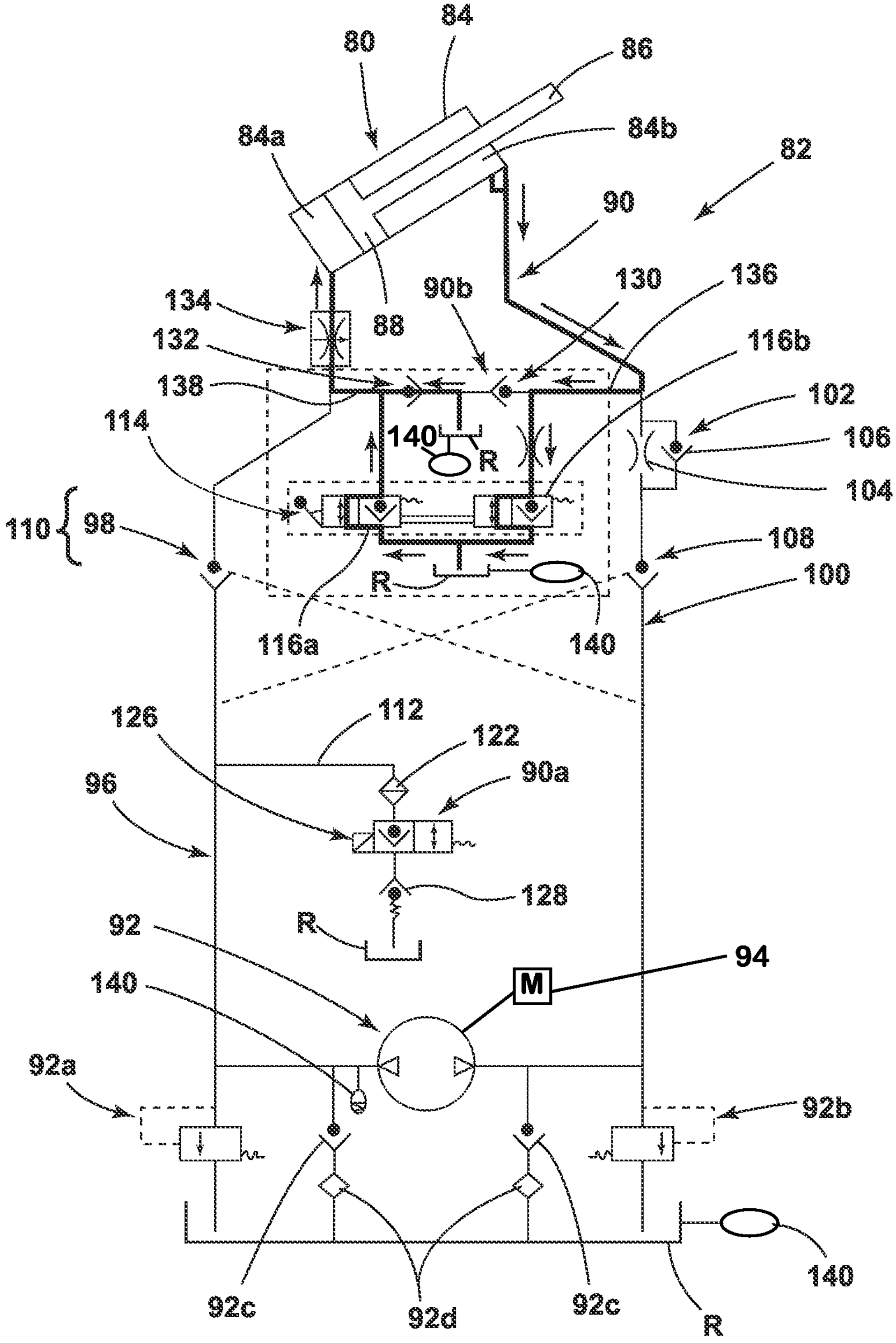
FIG. 6D is similar to FIG. 6C illustrating the flow of hydraulic fluid when extending the rod of the cylinder when manually lowering the base of the patient handling apparatus, for example, when the patient support surface is in a loading configuration and supported by an emergency vehicle.

Referring to FIGS. 6C and 6D, lift assembly 20 can also operate in Mode 7 and Mode 8, which are both manual modes as noted above. Mode 7 allows an EMS attendant to manually retract the base 18 when apparatus 10 is in its transport configuration and the frame 12 is supported in the loading/unloading position by an emergency vehicle. Mode 8 allows an EMS attendant to let gravity lower the base 18 when the apparatus 10 is in its loading configuration and the frame 12 is supported in the loading/unloading position (FIG. 6D) by an emergency vehicle. Modes 7 and 8 are activated when the manual release valve assembly 114 is moved to its manual position to allow the hydraulic circuit to bypass the pump 92 via a backup manual bypass hydraulic circuit 90*b*, for example, in the event that there is no power, or there is a pump or motor failure, or for whatever reason when the cot 10 needs to be manually operated.

Referring to FIG. 6C, Mode 7 is a manually operated mode when the rod of the cylinder is contracted. In this mode, when the cot 10 is in its transport configuration and the frame 12 is supported in the loading/unloading position (and there is no power or they simply wish to use the manual mode)), an EMS attendant can manually raise the base 18. Alternately, when the cot 10 is in its transport configuration and the base 18 is supported on a ground or floor surface, an EMS attendant can manually lower the frame 12 onto the base 18. In either case, a user selects Mode 7 by manually activating manual release valve assembly 114, e.g., by pressing a button (described more fully below) and manually raising the base or lowering the frame to thereby contract the rod of the cylinder.

In Mode 7, manual bypass hydraulic circuit 90*b* allows fluid flow (see arrows in FIG. 6C) between cylinder 80 and reservoir R via hydraulic conduits 136 and 138, as controlled by the pressure in cylinder 80, and by check valves 130 and 132. For example, in Mode 7, fluid flows to the rod end 84*b* of cylinder 80 when the rod 86 is retracting. When the fluid in conduit 136 is directed to the rod end 84*b* of cylinder, the pressure in the conduit 136 adjacent check valve 130 may drop (depending on how fast the rod is being retracted) allowing check valve 130 to open so that more fluid may be directed to the rod end 84*b* from reservoir R. Fluid returns to the reservoir R from cap end 84*a* of cylinder 80 via hydraulic conduit 138 and through opened manually operated manual release valve assembly 114.

Referring to FIG. 6D, as noted above, Mode 8 is also a manually operated mode and is generally used to extend the rod, for example, when an EMS attendant wishes to lower the base 18 when the cot 10 is in its loading configuration and the frame 12 is supported in the loading/unloading position. Alternately, Mode 8 also may be used, for example, when an EMS attendant wishes to raise the frame 12 when the cot 10 is in its loading configuration and the base 18 is supported on the ground or floor surface. Again, a user selects Mode 8 by manually activating manual release valve assembly 114 to bypass pump 92. The direction of fluid flow is reversed from that described above, so fluid flows from reservoir R through manual bypass hydraulic circuit 90*b* to cap end 84*a* of cylinder 80 via hydraulic conduit 138. Again, when fluid flows through conduit 138 to cap end 84*a*, the pressure adjacent check valve 132 may drop (depending on the speed of the extension of the rod) allowing the check valve to open so that additional fluid flow from reservoir R may flow through valve 132 and into conduit 138 and to the cap end chamber 84*a* of cylinder 80. In this manner, the cylinder can be extended to allow lowering of the base or lifting of the frame. Fluid returns to the reservoir R from rod end 84*b* of cylinder 80 via hydraulic conduit 136 and through opened manually operated manual release valve assembly 114.

In the manual retract and extend modes of Mode 7 and 8 as described above, fluid flow into and out of the cylinder the hydraulic circuit 90 is manually released on the appropriate side of the cylinder 80 to allow the cot 10 to be lowered from the transport position to the lowered position, and vice versa, and an infinite number of positions therebetween, as a back-up in no-power situations or to conserve battery power. Therefore, the above-described manual modes may also be used when raising the frame without power assist, dropping the base 18 when unloading from an emergency vehicle, and lifting the base 18 when loading into an emergency vehicle.

As will more fully described below in references to FIGS. 9-11, manual release valve assembly 114 may be configured to provide a single user input to open fluid communication between both sides (cap side and rod side) of the cylinder and the reservoir.

In one embodiment, to increase the pressure in the manual bypass circuit, hydraulic circuit may also include an accumulator 140 (FIGS. 6A and 7) in fluid communication with the reservoir. Accumulator 140 stores energy in the form of fluid, which is then available for use when needed. For example, patient handling apparatus 10 may have sliding pivot connection between its lift assembly and its litter frame (frame 12) that is non-linear, such as described in co-pending application, PATIENT HANDLING APPARATUS WITH HYDRAULIC CONTROL SYSTEM, application number Ser. No. 15/949,648 filed on Apr. 10, 2018, which is incorporated herein by reference in their entirety.

By its geometric shape, the non-linear path includes a geometric valley where there is increased resistance to continued extension of the hydraulic cylinder and lift assembly. As a result, when raising the frame and litter deck, the force needed to fully extend the lift mechanism may increase at this point along the path. In the powered mode, the control system 82 may compensate and generate a sufficient force to overcome the increased resistance, but in the manual mode, the weight of the base may not be sufficient to fully extend the cylinder and lift mechanism. Accordingly, accumulator 140 can provide the additional energy in the form of additional fluid and pressure to assist in the lowering of the base though this region of increased resistance. Further, the additional fluid and pressure may be directed to the cap side chamber of the cylinder. As noted below, other or additional accumulators may be used to maintain submersion of the pump inlet in hydraulic fluid, for example, when the orientation of the pump is changed due to handling of the patient handling apparatus or due to a different mounting arrangement in the patient handling apparatus or to maintain pressure in the hydraulic circuit.

Figure 6E:
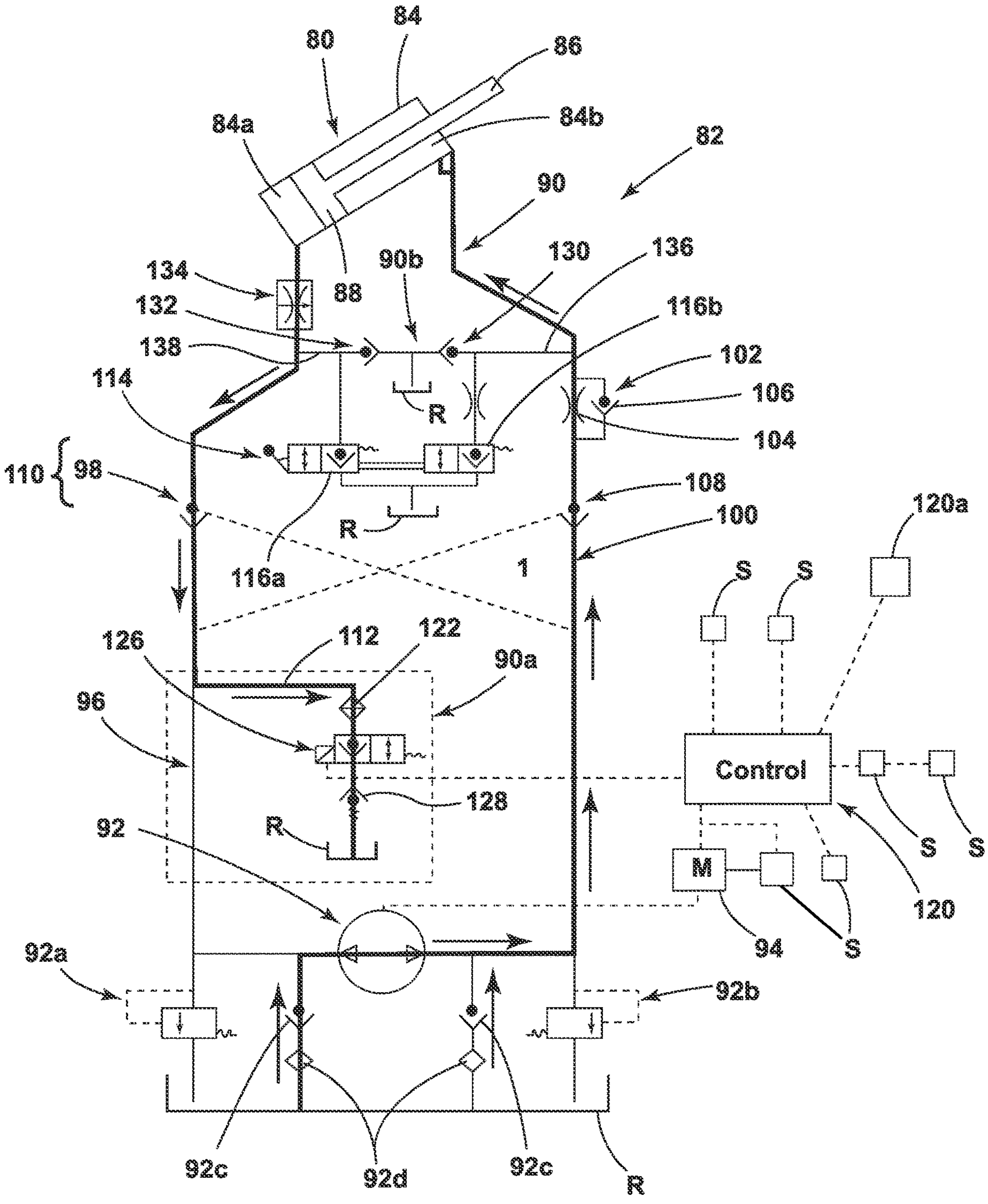
FIG. 6E is a hydraulic circuit diagram of FIG. 6 including a pump bypass hydraulic circuit in one embodiment of the ambulance patient handling apparatus illustrating the flow of hydraulic fluid in a powered mode to rapidly retract the base of the patient handling apparatus (for example when the patient support surface is in a transport configuration and supported by an emergency vehicle)

Referring to FIG. 6E, as noted above, lift assembly 20 can also operate in Mode 5 to quickly retract the base 18 when cot 10 is in its transport configuration and the frame 12 is supported in the loading/unloading position. Mode 5 operates at an increased speed relative to the nominal speed described for the modes above. As would be understood by those skilled in the art, the speed of the cylinder (or cylinders) may be increased by increasing the flow of hydraulic fluid and/or pressure of the hydraulic fluid flowing to the cylinder(s), which can be achieved by increasing the output of the pump by increasing the speed of the motor.

Mode 5 is generally used to quickly raise (retract) the base 18 from its transport configuration when the frame 12 is supported in the loading/unloading position. This is usually used when an EMS person is trying to quickly load the patient handling apparatus 10 into an emergency vehicle. When a user selects a retract mode via interface controls 120*a* (– button FIG. 1A, e.g.) and controller 120 detects via sensor that the base 18 is not supported and is not connected to a loading and unloading apparatus, controller 120 will operate in Mode 5 and automatically increase the speed of the cylinder 80 over nominal speed. In Mode 5, the direction of pump 92 is reversed, so that fluid will flow in an opposite direction (see arrows in FIG. 6E) to cylinder 80 through hydraulic conduit 100, which is in fluid communication with the rod end chamber 84*b* of the cylinder housing 84. As noted above, conduit 100 includes check valve assembly 102, with orifice 104 and check valve 106 in parallel. When fluid flow is in this direction, fluid will open check valve 106 and allow fluid to flow to rod end 84*b* of cylinder 80. Fluid flow in this direction will cause the rod 86 to quickly retract and raise the base 12.

Optionally, in order to speed up the retraction of the rod 86 (and therefore the base 12) when operating in Mode 5, hydraulic circuit 90 is configured to quickly reduce the pressure in the cap side of the cylinder by redirecting the fluid output from the cap end chamber 84*a* to the reservoir R directly rather than going through the pump.

For an ambulance cot designed to carry an adult person and that uses a single cylinder to raise or lower the frame (or retract or lower the base), an example of a low flow rate on the rod side may include a rate in a range of about 0.5 to 1.3 liters/min (1/m) or in a range of about 0.70 to 1.0 liters/minute or in a range of about 0.80 to 0.90 liters/minute. Similarly for an ambulance cot designed to carry an adult person, which uses a single cylinder to raise or lower the frame (or retract or lower the base), an example of a high flow rate on the rod side may include a rate in a range of about 2.0 to 3.0 liters/min (1/m) or in a range of about 2.3 to 2.7 liters/minute or in a range of about 2.40 to 2.6 liters/minute. For the cap side, the flow rate ranges would be approximately double that of the rod side.

In the illustrated embodiment, hydraulic circuit 90 includes a bypass circuit 90*a* that includes a hydraulic conduit 112 in fluid communication with hydraulic conduit 96 and with the reservoir though a check valve 128. Hydraulic conduit 112 may include an additional valve, such as a solenoid valve 126, which is controlled by controller 120. Thus, when controller 120 determines that it should operate in Mode 5, controller 120 will open solenoid valve 126 to redirect the fluid straight to the reservoir R from the cap end chamber 84*a* through check valve 128, allowing the fluid to exit the hydraulic cylinder 80 with greater speed than if the fluid were directed through the pump 92. Solenoid valve 126 is normally closed but can be selectively controlled (e.g., opened), as noted such as for Mode 5, so that the fluid may exit the cap end chamber 84*a* more quickly, thereby reducing the resistance to the cylinder piston and increasing the retraction speed of the rod 86 for a given flow of fluid. Hydraulic conduit 112 may also include a filter 122.

Figure 7:
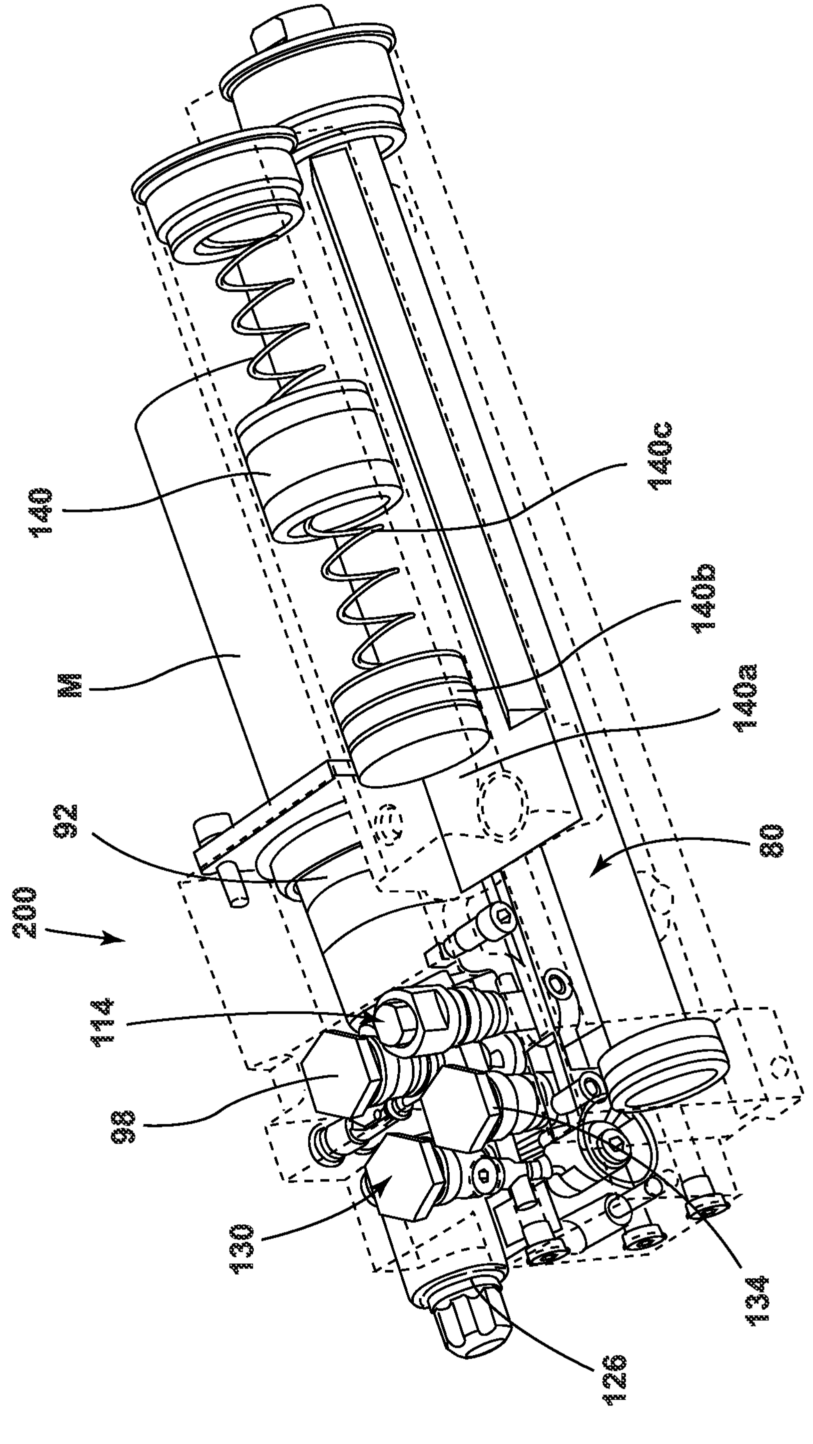
FIG. 7 is a transparent perspective view of the various components of the hydraulic system assembled as a unit.
Figure 8:
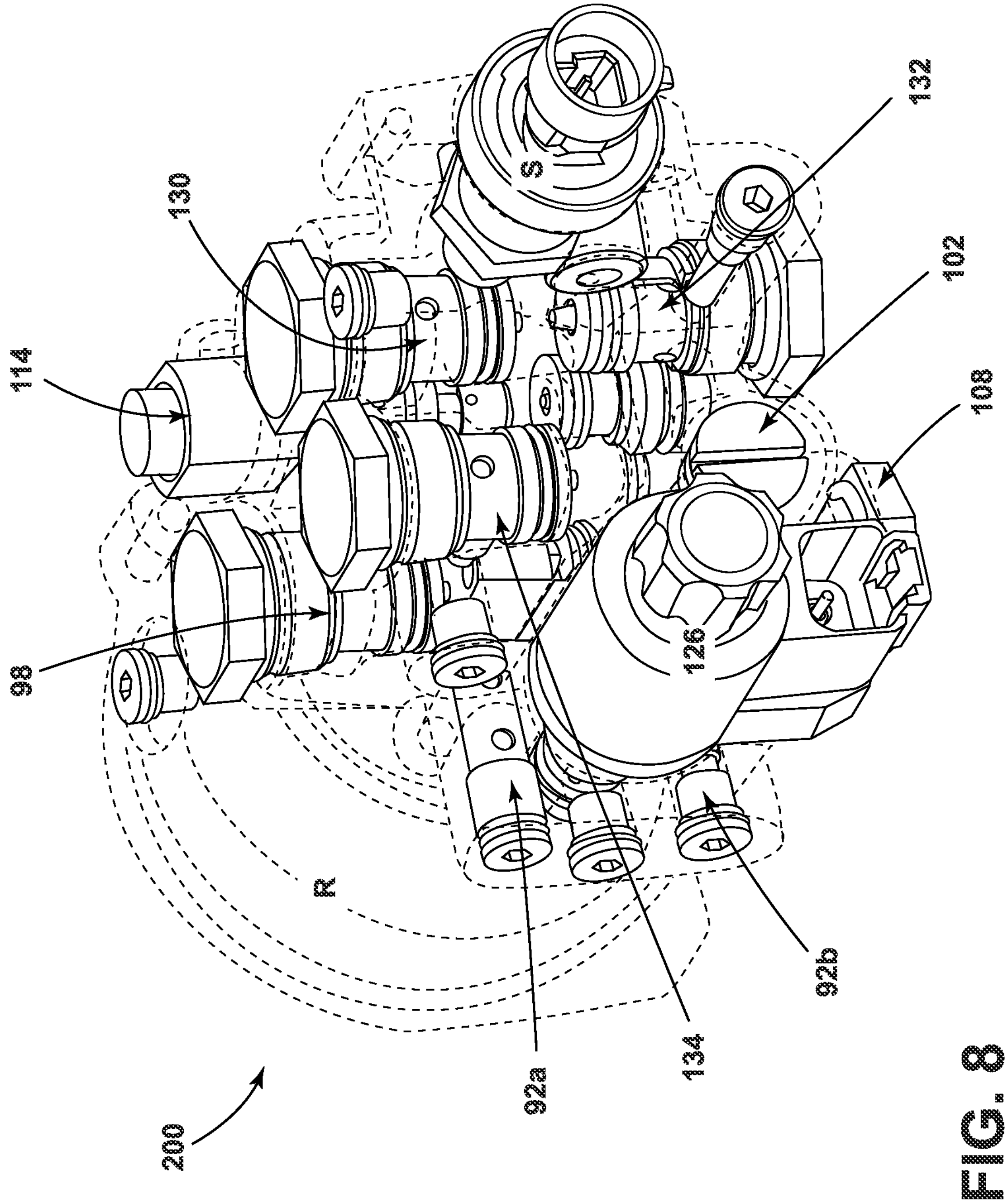
FIG. 8 is another transparent perspective view of the unit of FIG. 7.

Referring to FIGS. 6 and 6A, the hydraulic circuit 90 may also include an accumulator 140 in fluid communication with pump 92. Referring to FIG. 7, accumulator 140 includes a reservoir 140*a*, which is in fluid communication with a hydraulic component of the hydraulic circuit, for example the pump. The reservoir 140*a* may include a spring biased piston 140*b*, which is biased to pressurize the fluid in the reservoir by a spring 140*c*, which compresses piston 140*b* against the fluid in the reservoir. The pre-charge in the fluid in the reservoir, which can be set to a specific initial pressure, is a function of the spring and its initial setting—i.e., whether it is fully compressed or partially compressed. Further, the spring may a conventional coil spring whose force varies depending on the displacement or may be a constant spring whose force is constant through its displacement. In either case, the accumulator may maintain the supply of fluid to the hydraulic component, such as the pump, for example at a minimum pressure. As would be understood the minimum pressure is that pressure that is sufficient to allow the hydraulic circuit to achieve the desired function. For example, a minimum pressure may be in a range of 8 to 10 psi. It should be understood, however, that for different applications, this minimum pressure may be higher or lower.

An accumulator may also be used to pre-load either rod end chamber 84*a* or cap end chamber 84*a* of hydraulic cylinder 80 with fluid. It should be understood, therefore, accumulator or accumulators 140 can be included in the hydraulic circuit 90 to maintain pressure through the circuit, to store energy, and to smooth out any pulsations experienced in the circuit 90 due to differences in pressure throughout the circuit 90. Further, the accumulator 140 can store fluid in case of no-power situations, such as described above for Modes 7 and 8.

Additionally, accumulator 140 may be used to keep the intake of pump 92 submerged in fluid. As the cot 10 moves around during use, in a conventional arrangement of the pump 92, the intake of the pump may come out of the fluid, which can render the pump 92 inoperable or incapable of functioning properly. To avoid the intake of the pump 92 becoming unsubmerged in the fluid, accumulator 140 may be mounted to the pump 92 so that it is in fluid communication with and submerges the pump 92 intake. In this manner, the pump 92 can be mounted on the cot 10 in a location that is not limited by the pump intake and allows the pump 92 to be rotated while still being able to function. Although one accumulator 140 is illustrated (FIG. 7), it should be understood that more than one accumulator 140 may be used in the unit described below. It should also be understood that the accumulator 140 could be of any suitable type, including a spring type (as shown), gas charged type, and a raised weight type.

As noted above, control system 82 includes controller 120, which is also schematically represented in FIGS. 6 and 6A. Controller 120 may be powered by the battery (not shown) on board the patient handling apparatus 10. A hydraulic fluid pressure monitoring device (not shown) may be connected to the hydraulic circuit 90 to provide a signal to controller 120 indicative of the magnitude of the fluid pressure, which may be used as input when controlling the hydraulic cylinder 80.

Referring again to FIG. 6A, as noted above, controller 120 may be in communication with one or more sensors S, which generate input signals to controller 120 (or controller 120 may detect the state of the sensor) to allow controller 120 to adjust the hydraulic circuit based on an input signal or signals from or the status of the sensors. A suitable sensor may include a load sensor, such as the shunted load sensor described in co-pending U.S. Prov. Appl. Ser. No. 62/835,771, filed Apr. 18, 2019, which is commonly owned by Stryker Corp. and incorporated by reference herein in its entirety. Other suitable sensors include load sensors mounted to more of the caster wheel assemblies and/or pressure sensors detecting pressure in the hydraulic control system. Other suitable sensors that may be used include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like.

For example, controller 120 may control (e.g., open or close) the valve 126 to increase or stop the increased speed of cylinder 80 and/or slow or stop the pump to slow or stop the cylinder, or any combination thereof based on an input signal or signals from or the status of the sensor(s). Further, when valve 126 is open, controller 120 may control (e.g., close) the valve 126 before, after, or at the same time as slowing or stopping the pump based on an input signal or signals from or the status of the sensor(s). Alternately, controller 120 may slow, increase the speed of, or stop, the pump 92 in lieu of controlling the valve 126 (when valve is closed for example) based on an input signal or signals from or the status of the sensor(s).

In one embodiment, control system 82 may include one or more sensors used to detect a variety of conditions. For example, as noted, control system 82 may include sensors S for (1) detecting when the base 18 is contacting the ground or other surface, (2) detecting an increased load on the motor 94, (3) detecting the height of the patient handling apparatus 10, (4) detecting the configuration of the patient handling apparatus 10, (5) detecting when the patient handling apparatus 10 is connected to a loading and unloading apparatus (as noted above), and/or (6) detecting when a load on the motor 94 (or on the pump 92) occurs. As noted above, suitable sensors may include a load sensor, such as the shunted load sensor referenced above, a pressure sensor in the hydraulic control system, a transducer, such as a pressure sensor, including load cells, for example, mounted to one or more of the wheels or casters, Hall Effect sensors, proximity sensors, reed switches, optical sensors, ultrasonic sensors, liquid level sensors (such as available from MTS under the brand name TEMPOSONIC), linear variable displacement transformer (LVDT) sensors, or the like.

A suitable sensor may include a transducer, such as a pressure sensor, including a load cell, for example, mounted to one or more of the wheels or casters, which detect when an upward force is applied to the wheels or casters. Alternately, as described below, control system 82 may include one or more sensors to detect the increase in the load on the motor, for example, by detecting an increase in the motor's current, to detect when the base 18 is supported. Other suitable sensors (as noted above) may be used.

For example, when control system 82 detects that the base 18 is contacting or nearly contacting a ground surface or an obstruction, controller 120 may be configured to slow or stop the pump to slow the flow of fluid to the cylinder. A suitable sensor in that situation may comprise a proximity sensor, a hall effect sensor, or reed sensor. For example, the sensor may be supported by the litter frame. In addition, when valve 126 is open (for example to allow the cylinder to be driven at an increased speed), controller 120 may be configured to first close valve 126 so that cylinder 80 will no longer be driven at the increased speed and then, as noted, stopped when it is detected that base 18 is supported, for example on the ground or then deck of the emergency vehicle. Additionally, controller 120 may slow or stop the pump, either before, after, or at the same time as closing valve 126. Optionally, before, after, or at the same time as closing valve 126, controller may reverse the motor to avoid excess pressure build up in the hydraulic circuit 90.

So, for example, if an attendant is removing patient handling apparatus 10 from an emergency vehicle, and the operator has selected a lowering base function, and controller 120 detects that the base 18 is no longer supported, controller 120 may automatically open valve 126 so that cylinder 80 will be driven at the increased speed without any resistance from the cap side of the cylinder. On the other hand, once base 18 contacts or nearly contacts the ground surface and/or the base 18 is fully or nearly fully lowered, as will be more fully described below, controller 120 may close valve 126 so that cylinder 80 can no longer be driven at the increased speed and, further, may stop pump 92 so that cylinder 80 will no longer extend.

As noted above, controller 120 may control the pump 92 based on other signals. For example, controller 120 may have a height value stored therein (in the controller's memory or a separate memory in communication with controller 120) against which controller 120 compares the signal or signals. Based on whether the detected height (detected by the transducer or transducers) exceeds or is equal to or is less than the stored height value, controller 120 may be configured to control (e.g., open or close) valve 126. For example, when operating in mode (3), where valve 126 is open to increase the speed of rod 86, if controller 120 detects that the height of frame 12 is near or at (or exceeds) the stored height value, then controller 120 may be configured to close valve 126 to no longer drive cylinder 80 at the increased speed, and either before, after, or while closing valve 126 controller 120 may optionally slow or stop the pump. Further, as noted above, controller 120 may reverse the motor to avoid excess pressure in hydraulic circuit 90. Alternately, controller 120 may optionally stop pump 92 in lieu of closing valve 126.

In one embodiment, the stored height value may be less than the maximum height, and, therefore, controller 120 may be configured to close valve 126 before lift assembly reaches its maximum height. Additionally, as generally described above, controller 120 may be configured to slow or stop the pump to prevent overshoot. Further, on the other hand if the stored height value is the maximum height of lift assembly, then controller 120 may be configured to also to stop pump 92 either before, after or at the same time controller 120 closes valve 126.

In this manner, when control system 82 does not detect that the base 18 is at a specified height, e.g., when the transducers do not yet detect the magnets that correspond to a specified height of the base 18, control system 82 can operate cylinder at an increased speed but when it detects that the base 18 is near, at or exceeds the specified height, controller 120 may be configured to control hydraulic circuit 90 to slow or stop the extension of rod 86 of cylinder.

In another embodiment, control system 82 can operate cylinder 80 at an increased speed but when it detects that the base 18 is at a height approaching or near the specified height (e.g., before the base 18 reaches the ground or before lift assembly 20 reaches its maximum height or before reaching a prescribed configuration), controller 120 may be configured to control hydraulic circuit 90 to slow or stop the extension of rod 86 of cylinder, using any of the methods described above. For example, that can be achieved, by controlling (e.g., closing) valve 126, slowing or stopping the pump, or reversing the motor.

In any of the above embodiments, it should be understood that control system 82 can control hydraulic circuit 90 to slow or stop the extension of rod 86 of cylinder 80, using any of the methods described above, before the conditions noted above, such as before reaching a predetermined height, before reaching a predetermined configuration, before making contact with the ground or an obstruction, or before reaching a prescribed load on the motor etc. Further, control of the fluid through the hydraulic circuit may be achieved by controlling the flow rate or opening or closing the flow using the various valves noted above that are shown and/or described. Further, as noted to avoid excess pressure in the hydraulic circuit, controller 120 may reverse the motor when controlling the valves described herein or may slow or stop the motor and pump before reaching the target (e.g., maximum height). Additionally, also as noted, controller 120 may control the hydraulic circuit by (1) adjusting the flow control valves or valves (e.g., valve 126), (2) adjusting the pump 92 (slow down or stop) or 3) adjusting both the flow control valves or valves (e.g., valve 126) and the pump, in any sequence.

For further optional details on sensors, valves, and other hydraulic circuit configurations and control systems, reference is made to co-pending provisional application entitled HYDRAULIC VALVE AND SYSTEM, U.S. Appl. Ser. No. 62/926,611 filed on Oct. 28, 2019, and co-pending application entitled PATIENT HANDLING APPARATUS WITH HYDRAULIC CONTROL SYSTEM, U.S. application Ser. No. 15/949,648 filed on Apr. 10, 2018, which are incorporated herein by reference in their entirety. For examples of other suitable sensors that may be used, reference is made to U.S. application Ser. No. 16/271,117, which is entitled TECHNIQUES FOR DETERMINING A POSE OF A PATIENT SUPPORT TRANSPORT APPARATUS, filed Feb. 8, 2019 which is incorporated by reference herein in its entirety.

Further, it should be understood, in each instance above, where it is described that the controller or sensor or other components are in communication, it should be understood that the communication may be achieved through hard wiring or via wireless communication. Further, although illustrated as discrete separate components, the various components may be assembled or integrated together into a single unit or multiple units.

Figure 10:
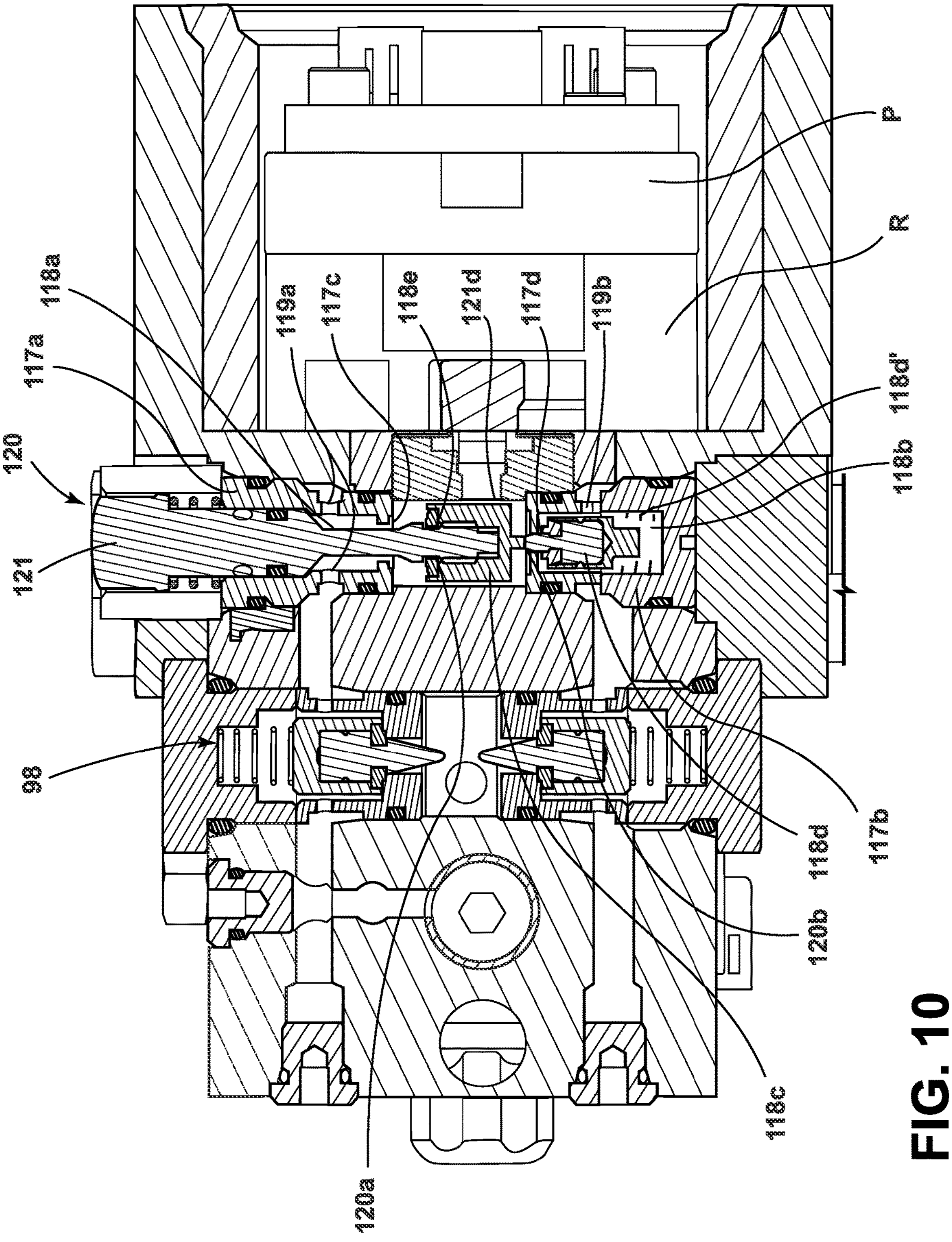
FIG. 10 is similar view to FIG. 9 illustrating the manual valve assembly in an activated or opened state.
Figure 11:
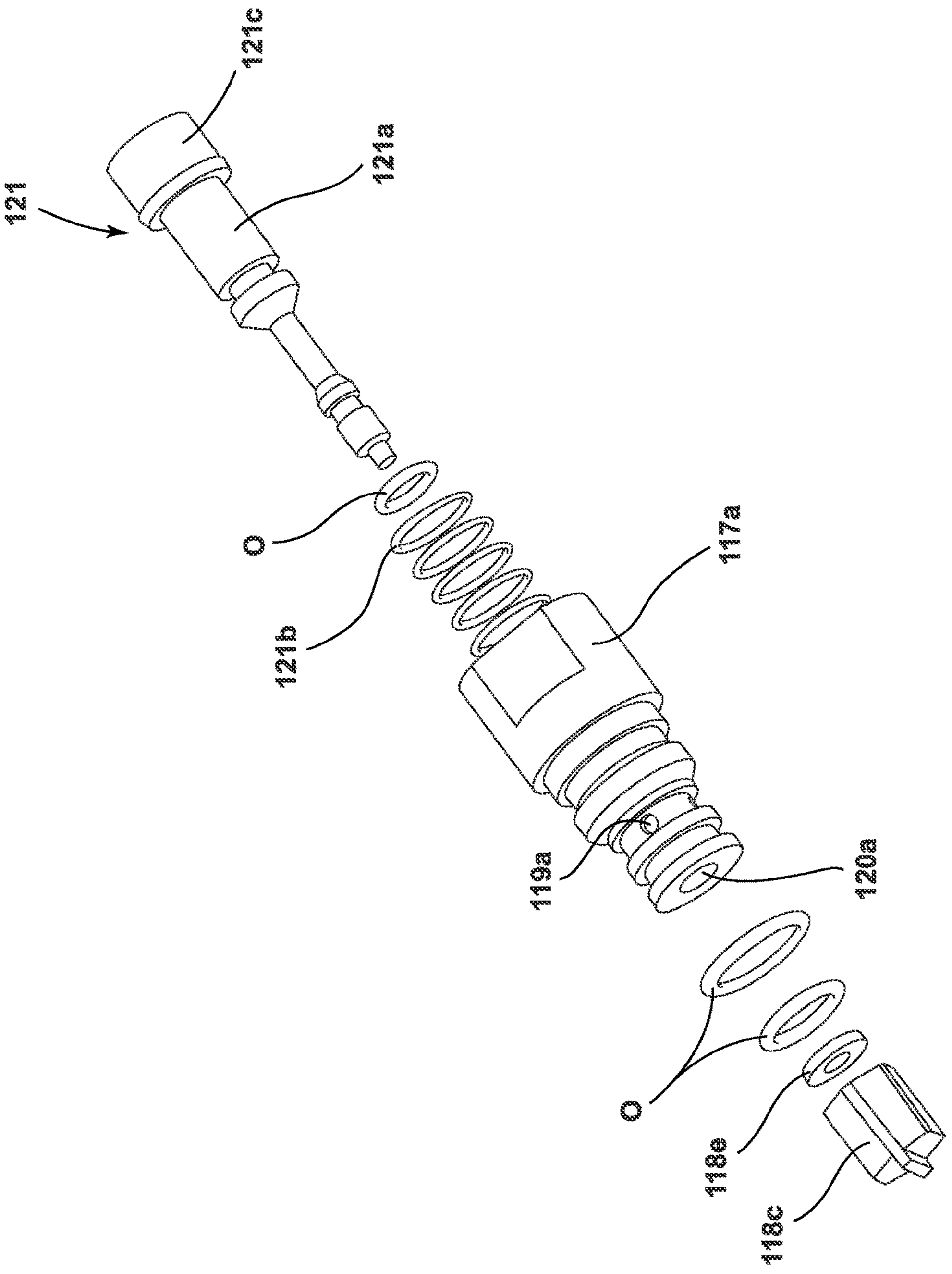
FIG. 11 is an exploded perspective view of the cap side valve and manual valve actuator of the manual valve assembly.

Referring to FIGS. 10-11, the various components described above may be assembled as a unit 200. Unit 200 may include: Cylinder 80, the motor M, the pump 92, the reservoir R, and/or the various valves (pilot operated check valves 98 and 108; check valve assembly 102; solenoid 126; manual valve assembly 114; flow control valve 134; check valves 130 and 132; and pressure relief valves 92*a*, 92*b*). In this manner, unit 200 may be installed as unit, simply requiring the ends of the cylinder to be coupled to components noted above and the motor to be coupled to a power supply, such as a battery. The unit 200 may include a block or housing in which each of the passageways that form the conduits and chambers (that form the valves and reservoirs) may be machined and assembled with the various components, such as pistons, seals, poppets etc. or preassembled valves, to form the flow paths and valving to control the flow of fluid as described above.

Figure 9:
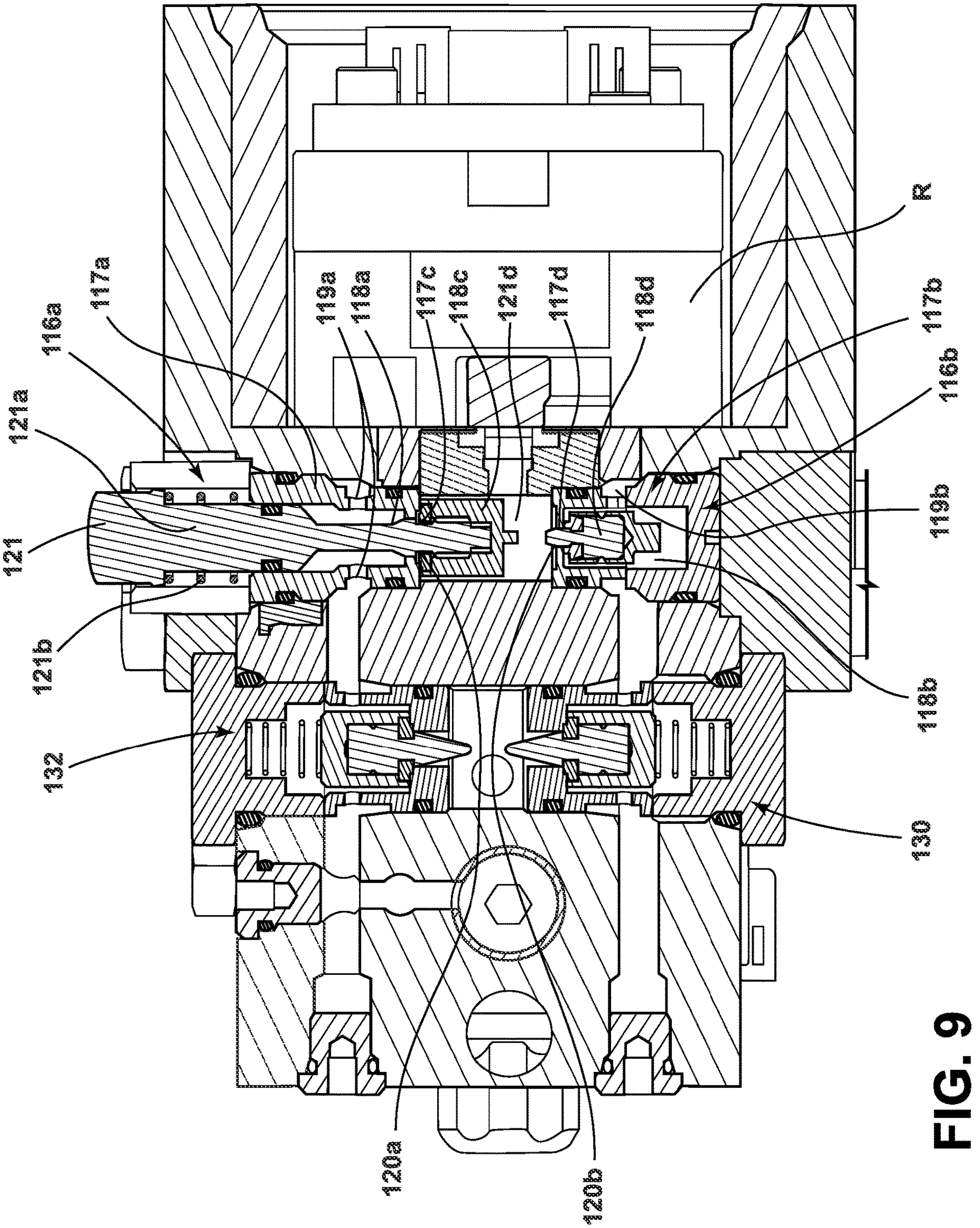
FIG. 9 is partial cross-section taken through FIG. 8 illustrating the manual valve assembly in a resting or unopened state.

To form the manual valve assembly 114, as best seen in FIGS. 9 and 10, valve assembly 114 includes a cap side valve 116*a* and a rod side valve 116*b*, each with a valve body 117*a*, 117*b* and a valve chamber 118*a*, 118*b*, which are in fluid communication with the respective cap end chamber 84*a* and rod end chamber 84*b* of the cylinder 80 via inlets 119*a*, 119*b*. Each valve chamber 118*a*, 118*b* includes an outlet 120*a*, 120*b* and a valve poppet 118*c*, 118*d*, which move in unison to open or close the outlets to provide selective fluid communication with reservoir R. In this manner, when both valves (116*a* and 116*b*) are opened, the cap end chamber 84*a* and rod end chamber 84*b* are in fluid communication with the reservoir R (through valves 116*a* and 116*b*) so that the rod can be manually extended or retracted with the displaced fluid flowing through the reservoir.

To open both valves (116*a*, 116*b*), manual valve assembly 114 optionally includes a single actuator 121. Actuator 121 supports the valve poppet 118*c* of valve 116*a* and when actuated (pressed) moves the valve poppet 118*c* off the valve seat 117*c* formed at outlet 120*a* of valve 116*a* as well as valve poppet 118*d* off the valve seat 117*d* formed at outlet 120*b* of valve 116*b*. Thus, actuator 121 and valve poppet 118*c* are configured as an actuator for valve 116*b*.

As best seen in FIGS. 9-11, actuator 121 has an elongated body 121*a* that is mounted in valve body 117*a* for linear movement and, further, includes an upper end that extends externally of valve body 117*a* to form a button 121*c* for a user to press when the user desires to open up the manual valve assembly (and manually extend or contract cylinder 80). Elongated body 121*a* is biased by a spring 121*b* in a closed position such that poppet 118*c* is biased in its closed position. Similarly, poppet 118*d* is biased in its closed position by a spring 118*d*' located in chamber 118*b* so that both valve poppets are biased and seated against their respective valve seats. So, until button 121*c* is pressed with sufficient force to compress the springs 121*b* and 118*d*', valves 116*a* and 116*b* will remain closed.

When a user desires to open up the manual valve assembly 114 to manually extend or contract cylinder 80, the user can press button 121*c* to compress spring 121*b*. When pressed, elongated body 121*a* will move valve poppet 118*c* off the valve seat 117*c* of valve body 117*a* (of cap side valve 116*a*) and push valve poppet 118*d* away from valve seat 117*d* of valve body 117*b* (of rod side valve 116*b*) to thereby open fluid communication between valve chambers 118*a* and 118*b* and another chamber 121*d* (FIG. 9) (located between valves 116*a* and 116*b*) that is in fluid communication with the reservoir R and to thereby allow the flow of fluid between the cap side and rod side of the cylinder.

In the illustrated embodiment, a user must maintain pressure on actuator 121 to open manually operable valve assembly 114. However, it should be understood that the actuator and/or valve body may be configured to provide a push-push configuration where the actuator 121 once pressed will remain in the open position and only return to its closed position when the button 121*c* is pushed again.

Although illustrated but not specifically mentioned herein, it should be understood that the actuator and valve components of the manual valve assembly 114, as well as various other components of the other valves, include seals O (FIG. 11), such as O-ring seals, to seal the respective valve chambers.

For further details of the patient handling apparatus, such as frame 12, deck 13, telescoping members 44, base 18, brackets 54 and 56, linkage members 50 and 52, and a gatch mechanism, and other structures not specifically mentioned or described herein, reference is made to U.S. Pat. Nos. 5,537,700 and 7,398,571, and published Application No. WO 2007/123571, commonly owned by Stryker Corporation, which are herein incorporated by reference in their entireties.

For further optional details on how lift assembly 20 may be mounted to frame 12, reference is made to co-pending application entitled EMERGENCY COT WITH A LITTER HEIGHT ADJUSTMENT MECHANISM, application number Ser. No. 15/949,624 filed on Apr. 10, 2018, which is incorporated herein by reference in its entirety.

The terms "head-end" and "foot-end" used herein are location reference terms and are used broadly to refer to the location of the cot that is closer to the portion of the cot that supports a head of a person and the portion of the cot that supports the feet of a person, respectively, and should not be construed to mean the very ends or distal ends of the cot.

The embodiments of the invention in which an exclusive property or privilege is claimed are defined as follows:

1. A patient handling apparatus comprising:
- a patient support surface;
- a base; and
- a hydraulic circuit comprising:
  - a hydraulic cylinder operable to selectively move the patient support surface or the base relative to the other of the patient support surface or the base, the hydraulic cylinder having a rod, a cap end chamber, and a rod end chamber, the rod having an extension or retraction speed;
  - a pump; and
  - a fluid reservoir; and
  - the hydraulic circuit being operable to control the flow of hydraulic fluid between the hydraulic cylinder and the fluid reservoir, wherein the hydraulic circuit includes a bypass circuit configured to selectively open fluid communication between the hydraulic cylinder and the fluid reservoir to bypass the pump for faster evacuation of the hydraulic fluid from the hydraulic cylinder, wherein the hydraulic circuit includes an accumulator separate from and in fluid communication with the hydraulic cylinder and the fluid reservoir to maintain pressure of the hydraulic fluid in the hydraulic circuit,
  - wherein the accumulator maintains an inlet of the pump submerged in hydraulic fluid, and wherein the accumulator is pre-charged to pressurize hydraulic fluid in at least one of the accumulator and the reservoir.

2. The patient handling apparatus of claim 1, wherein the hydraulic cylinder is operable to selectively raise or lower the patient support surface or the base relative to the other of the patient support surface or the base.

3. The patient handling apparatus of claim 1, wherein the bypass circuit is configured to selectively open fluid communication between the hydraulic cylinder and the fluid reservoir to allow increased retraction speed of the rod and quickly move the base relative to the patient support surface.

4. The patient handling apparatus of claim 1, further comprising a lift assembly supporting the patient support surface relative to the base, the hydraulic cylinder configured to extend or retract the lift assembly to thereby raise or lower the base or the patient support surface relative to the other.

5. The patient handling apparatus of claim 4, further comprising a control system operable to control the hydraulic circuit.

6. The patient handling apparatus of claim 5, wherein the control system is operable to control the hydraulic circuit to raise or lower the patient support surface to a transport height.

7. The patient handling apparatus of claim 6 wherein the control system is operable to direct the patient support surface to the transport height in response to user input, and wherein the transport height corresponds to a repeatable position for transport regardless of whether the patient support surface is initially higher or lower relative to the transport height prior to the user input.

8. The patient handling apparatus of claim 5, wherein the bypass circuit includes a control valve to control fluid communication between the hydraulic cylinder and the fluid reservoir, the bypass circuit being configured to selectively open the control valve to allow fluid to discharge from the cap end chamber to the fluid reservoir.

9. The patient handling apparatus of claim 8, wherein the control valve comprises a solenoid valve, and the control system is in communication with the solenoid valve to control opening or closing of the solenoid valve.

10. The patient handling apparatus of claim 8, the hydraulic circuit includes a check valve to control the speed of fluid flow into the hydraulic cylinder.

11. The patient handing apparatus of claim 1, wherein the hydraulic circuit includes a manual bypass circuit configured to selectively bypass the pump yet maintain fluid communication between the hydraulic cylinder and the fluid reservoir to allow manual operation of the hydraulic cylinder.

12. The patient handling apparatus of claim 11, wherein the manual bypass circuit includes a single manually operable valve assembly that is operable to selectively bypass the pump and to provide fluid communication between the hydraulic cylinder and the fluid reservoir.

13. The patient handling apparatus of claim 12, wherein the single manually operable valve assembly is configured to provide fluid communication between a rod end and a cap end of the hydraulic cylinder and the fluid reservoir.

14. The patient handling apparatus of claim 11, wherein the hydraulic cylinder includes a cap end chamber and a rod end chamber, and wherein the hydraulic circuit is configured to maintain pressure in the cap end chamber when the hydraulic cylinder is being manually extended.

15. The patient handling apparatus of claim 14, wherein the single manually operable valve assembly of the manual bypass circuit includes a manual input to open fluid communication between the hydraulic cylinder and the fluid reservoir.

16. A patient handling apparatus comprising:

a patient support surface;

a base; and a hydraulic circuit including a pump, a fluid reservoir, and a hydraulic cylinder operable to selectively move the patient support surface or the base relative to the other of the patient support surface or the base, and the hydraulic circuit being operable to control the flow of hydraulic fluid between the hydraulic cylinder and the fluid reservoir, wherein the hydraulic circuit includes an accumulator separate from and in fluid communication with the hydraulic cylinder and the fluid reservoir to maintain pressure of the hydraulic fluid in the hydraulic circuit, wherein the accumulator maintains an inlet of the pump submerged in hydraulic fluid, and wherein the accumulator is pre-charged to pressurize hydraulic fluid in at least one of the accumulator and the reservoir.

17. The patient handling apparatus of claim 16, the hydraulic circuit includes a manual bypass circuit configured to selectively bypass the pump yet maintain fluid communication between the hydraulic cylinder and the fluid reservoir to allow manual operation of the hydraulic cylinder, and the accumulator configured to maintain pressure of the hydraulic fluid in the manual bypass circuit.

18. The patient handling apparatus of claim 17, the hydraulic cylinder having a cap end chamber and a rod end chamber, wherein the accumulator is configured to maintain pressure in the cap end chamber when the hydraulic cylinder is being manually extended.

19. The patient handing apparatus of claim 16, wherein the hydraulic circuit includes a manual bypass circuit configured to selectively bypass the pump yet maintain fluid communication between the hydraulic cylinder and the fluid reservoir to allow manual operation of the hydraulic cylinder.

20. The patient handling apparatus of claim 19, wherein the manual bypass circuit includes a single manually operable valve assembly that is operable to selectively bypass the pump and to provide fluid communication between the hydraulic cylinder and the fluid reservoir.

* * * * *